United States Patent
Johnson et al.

(10) Patent No.: US 10,309,132 B1
(45) Date of Patent: Jun. 4, 2019

(54) PASSENGER VEHICLE AND DOOR STRUCTURE

(71) Applicants: Noell G. Johnson, Gilroy, CA (US); Ibuki Kamei, Santa Clara, CA (US); John Raff, Menlo Park, CA (US); Donald R. Monroe, Los Gatos, CA (US); Albert J. Golko, Saratoga, CA (US); Phil M. Hobson, Menlo Park, CA (US); David J. Donohue, San Francisco, CA (US); Jae Young Huh, Sunnyvale, CA (US); Matthew L. Brown, San Jose, CA (US)

(72) Inventors: Noell G. Johnson, Gilroy, CA (US); Ibuki Kamei, Santa Clara, CA (US); John Raff, Menlo Park, CA (US); Donald R. Monroe, Los Gatos, CA (US); Albert J. Golko, Saratoga, CA (US); Phil M. Hobson, Menlo Park, CA (US); David J. Donohue, San Francisco, CA (US); Jae Young Huh, Sunnyvale, CA (US); Matthew L. Brown, San Jose, CA (US)

(73) Assignee: Apple Inc., Cupertino, CA (US)

(*) Notice: Subject to any disclaimer, the term of this patent is extended or adjusted under 35 U.S.C. 154(b) by 12 days.

(21) Appl. No.: 15/623,967

(22) Filed: Jun. 15, 2017

Related U.S. Application Data

(60) Provisional application No. 62/350,871, filed on Jun. 16, 2016.

(51) Int. Cl.
*E05B 83/38* (2014.01)
*E05B 77/02* (2014.01)
(Continued)

(52) U.S. Cl.
CPC ............ *E05B 83/38* (2013.01); *B60J 5/0479* (2013.01); *E05B 77/02* (2013.01); *E05B 81/20* (2013.01);
(Continued)

(58) Field of Classification Search
CPC .......... E05B 77/02; E05B 83/38; E05B 81/20; B60J 5/0477; B60J 5/0479; B60J 5/0423;
(Continued)

(56) References Cited

U.S. PATENT DOCUMENTS 3,019,492 A 2/1962 Schimek
5,095,655 A 3/1992 Warren
(Continued)

OTHER PUBLICATIONS

Blogspot.com, "The Electric BMW i3: BMW i3 Repair Process Deep Dive", Posted by Tom Moloughney on Jul. 11, 2014, Downloaded Oct. 20, 2016, http://bmwi3.blogspot.com/2014/07/bmw-i3-repair-process-deep-dive.html, 8 pp.
(Continued)

*Primary Examiner* — Gregory A Blankenship
(74) *Attorney, Agent, or Firm* — Young Basile Hanlon & MacFarlane, P.C.

(57) ABSTRACT

A passenger vehicle a vehicle body, a front door, and a rear door. The vehicle body comprises a forward base structure, a rearward base structure, and a floor structure extending between the forward base structure and the rearward base structure, which cooperatively define a passenger compartment and a continuous opening for a passenger to enter into and exit out of the passenger compartment. The front door is movable between a first closed position and a first open position. The rear door is movable between a second closed position and a second open position. When the front door is in the first closed position and the rear door is simultane-
(Continued)

ously in the second closed position, the continuous opening is closed cooperatively by the front door and the rear door.

30 Claims, 12 Drawing Sheets

(51) Int. Cl.
*B60J 5/04* (2006.01)
*B62D 25/04* (2006.01)
*E05B 81/20* (2014.01)
*B62D 25/06* (2006.01)
*B62D 25/20* (2006.01)

(52) U.S. Cl.
CPC ............ *B60J 5/0429* (2013.01); *B62D 25/04* (2013.01); *B62D 25/06* (2013.01); *B62D 25/2036* (2013.01)

(58) Field of Classification Search
CPC ...... B60J 5/0426; B60J 5/0431; B60J 5/0433; B60J 5/0429; B60J 5/0443; B60J 5/0447; B60J 5/0456; B60J 5/0459
USPC ................................ 296/146.1, 146.5, 146.6
See application file for complete search history.

(56) References Cited

U.S. PATENT DOCUMENTS

| | | | | |
|---|---|---|---|---|
| 5,224,752 | A * | 7/1993 | Marshall | B60J 5/0426 292/144 |
| 5,431,476 | A * | 7/1995 | Torigaki | B60J 5/0427 296/146.6 |
| 5,800,007 | A * | 9/1998 | Cho | B62D 25/04 296/146.6 |
| 6,926,340 | B2 * | 8/2005 | Moriyama | B60J 5/0425 296/146.6 |
| 8,793,938 | B2 | 8/2014 | Grudzinski et al. | |
| 2002/0175537 | A1 * | 11/2002 | Cress | B60J 5/0429 296/187.12 |
| 2004/0104592 | A1 * | 6/2004 | Fisher | E05B 15/0006 296/146.1 |
| 2005/0093335 | A1 * | 5/2005 | Herrmann | B60J 5/0487 296/146.6 |
| 2006/0125284 | A1 * | 6/2006 | Kristl | B60J 5/047 296/146.11 |
| 2007/0102955 | A1 | 5/2007 | Bodin et al. | |
| 2007/0187986 | A1 * | 8/2007 | Wikstrom | B60J 5/0429 296/146.6 |
| 2007/0210611 | A1 * | 9/2007 | Melz | B60J 5/0429 296/146.6 |
| 2009/0146451 | A1 | 6/2009 | Broadhead | |
| 2009/0184501 | A1 * | 7/2009 | Hirotani | B60J 5/0451 280/730.2 |
| 2009/0236871 | A1 * | 9/2009 | Shibasaki | B60J 5/0426 296/146.6 |
| 2010/0148535 | A1 * | 6/2010 | Takahashi | B60J 5/0426 296/187.12 |
| 2013/0057018 | A1 * | 3/2013 | Reese | B29C 45/1418 296/146.6 |
| 2016/0145913 | A1 * | 5/2016 | Machida | E05C 3/12 292/196 |
| 2017/0240029 | A1 * | 8/2017 | Moriyama | B60J 5/042 |
| 2017/0362878 | A1 | 12/2017 | Gage | |

OTHER PUBLICATIONS

Blog.caranddriver.com, "Mercedes-Benz F 015 Luxury in Motion Concept: Is This the Vehicular Future?", Mercedes-Benz F 015 Luxury in Motion Concept Debuts—News—Car and Driver, Jan. 6, 2015, by Jens Meiners, Downloaded Jun. 5, 2017, http://blog.caranddriver.com/mercedes-benz-f-105-luxury-in-motion-conept-is-this-the-vehicular-future/, 7 pp.
Autoblog.com, "Mercedes-Benz reveals Ocean Drive concept for Detroit", Dec. 20, 2006, by Alex Nunez, Downloaded Jun. 5, 2017, http://www.autoblog.com/2006/12/20/mercedes-benz-reveals-ocean-drive-concept-for-detroit/, 11 pp.
Blog.caranddriver.com, "Cadillac Ciel Concept", Car News, Aug. 2011, by Jared Gall, Downloaded Jun. 5, 2017, http://blog.caranddriver.com; /news/cadillac-ciel-concept-news; /photo-gallerty/cadillac-ciel-concept-news, 9 pp.
Octopup.org, "Discover the significant changes in the timeless Lincoln Continental for 1964", Form No. LC-64-109, Printed USA Aug. 1963, Downloaded Jun. 5, 2017, http://octopup.org/img/car/lincoln/info/1964-Lincoln--Brochure.pdf, 19 pp.
Thesamba.com, "The Ghia-Karmann Volkswagen", Apr. 1956, Downloaded Jun. 5, 2017, https://www.thesamba.com/vw/archives/lit/ghia_roadtests/april-56-r_t-KG-review-pg1.jpg and https://www.thesamba.com/vw/archives/lit/ghia_roadtests/april-56-r_t-KG-review-pg2.jpg, 2 pp.
Siler, Steve, "2016 Rolls-Royce Dawn", The Term "Ragtop" Has Never Been More of a Misnomer, Mar. 2016, http://www.caranddriver.com/reviews/2016-rolls-royce-dawn-first-drive-review, 15 pp.
Pund, Daniel, "2014 Rolls-Royce Wraith", Ghost in the Machine, Sep. 2013, http://www.caranddriver.com/reviews/2014-rolls-royce-wraith-first-drive-review, 32 pp.

* cited by examiner

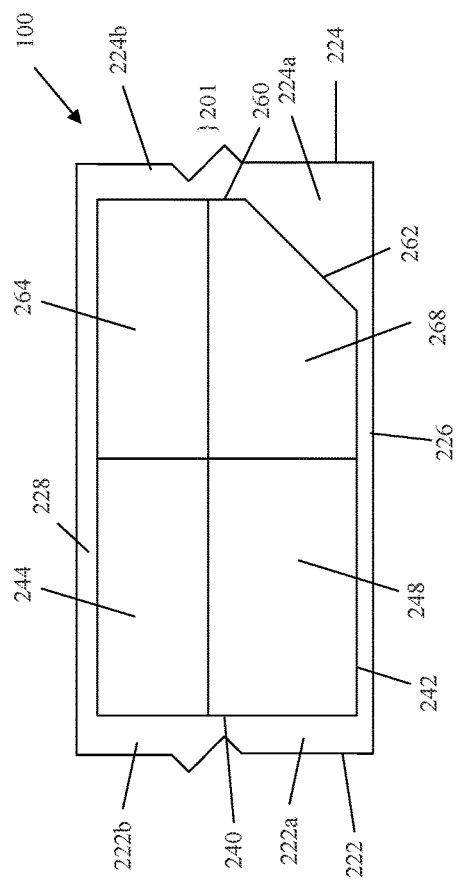
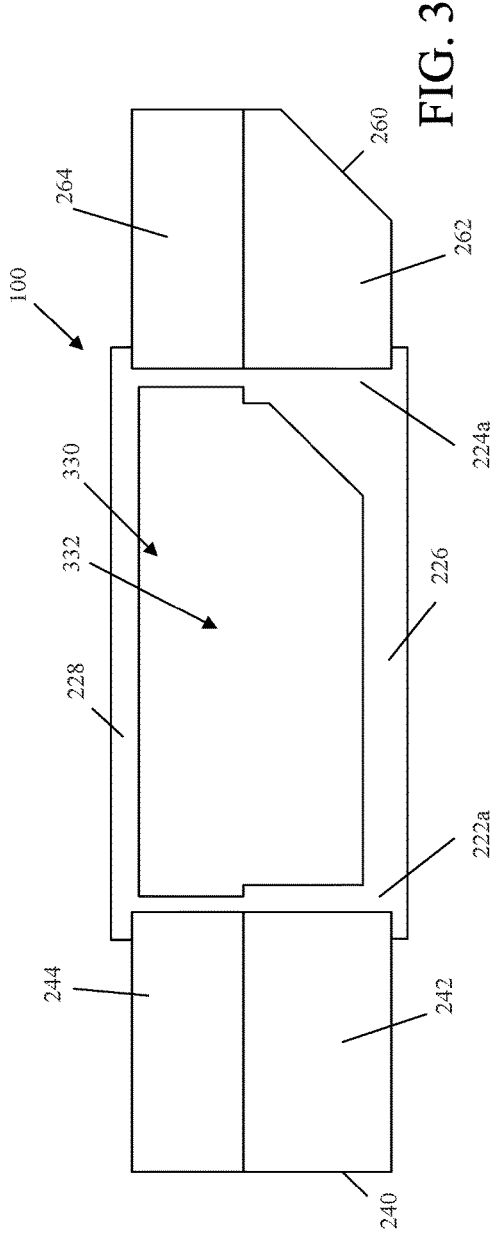

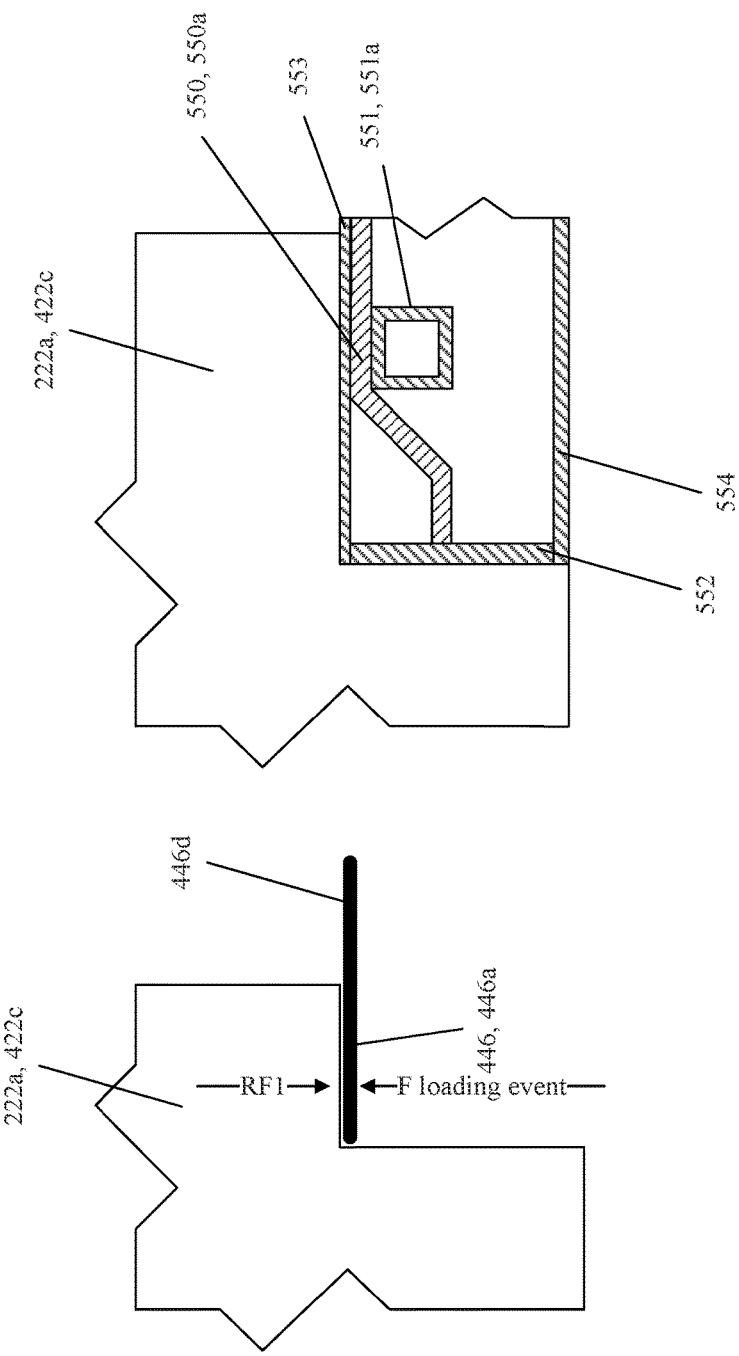

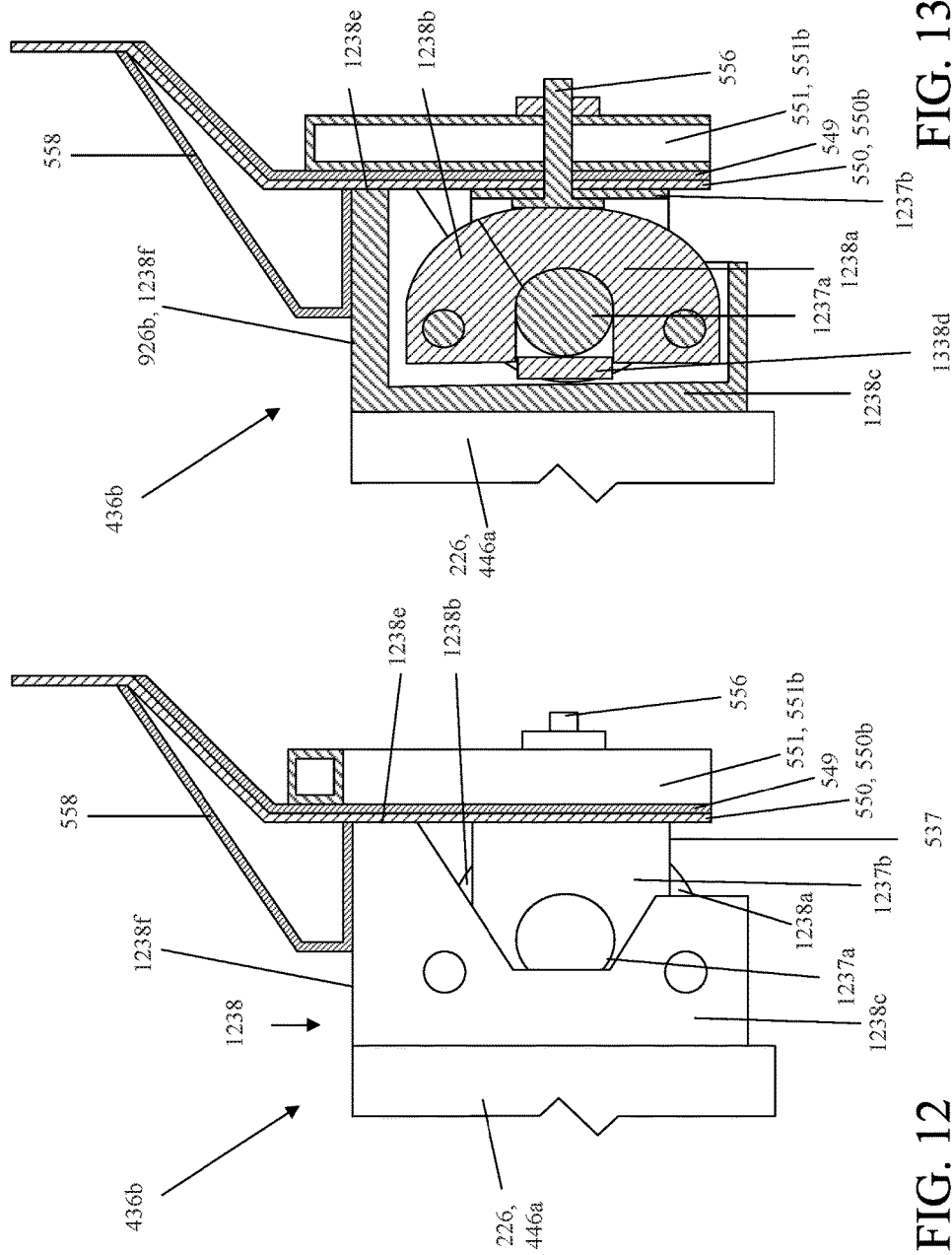

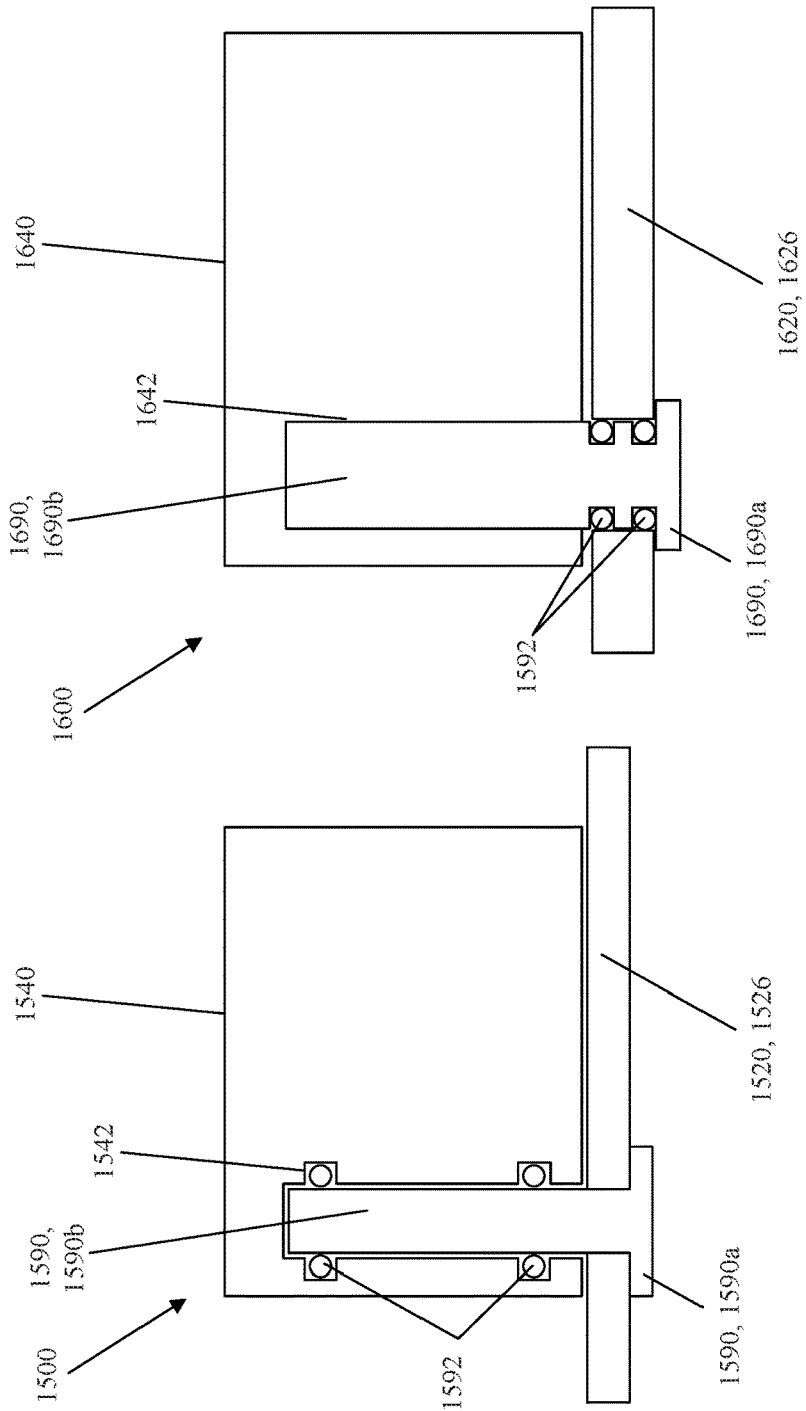

PASSENGER VEHICLE AND DOOR STRUCTURE

CROSS-REFERENCE TO RELATED APPLICATION(S)

This application claims priority to and the benefit of U.S. Provisional Application No. 62/350,871, filed Jun. 16, 2016, which is incorporated herein by reference in its entirety. This application additionally incorporates by reference in their entireties U.S. Provisional Application No. 62/346,109, filed Jun. 6, 2016, and U.S. Utility application Ser. No. 15/613,969, filed Jun. 5, 2017.

TECHNICAL FIELD

This disclosure relates to passenger vehicles for roadways and, in particular, to door and body structures therefor.

BACKGROUND

Passenger vehicles for roadways, such as cars, trucks, or other automobiles, typically include doors whose ends are configured to transfer loading, such as standard dynamic and quasi-static loading during test procedures under Federal Motor Vehicle Safety Standards (FMVSS) 214, to static structures of a body structure of the passenger vehicle. In four-door vehicles (i.e., those having two openable doors on each side of a vehicle to provide passenger ingress and egress), the body structure of the vehicle typically includes an intermediately positioned vertical structure (e.g., a "B-pillar") extending upward from a floor structure to a roof structure of the body, which transfers standard loading from a rear end of a front door and a front end of a rear door to the roof and floor structures of the vehicle body. Other vehicles may include a movable vertical structure (e.g., contained in a front end of the rear door), which similarly transfers standard loading from the rear end of the front door and the front end of the rear door to the vehicle body. These vertical structures, however, impede passengers' view from inside to outside the vehicle, and can also define separate openings for passenger ingress/egress.

SUMMARY

Disclosed herein is a passenger vehicle that includes a vehicle body, a front door, and a rear door. The vehicle body comprises a forward base structure, a rearward base structure, and a floor structure extending between the forward base structure and the rearward base structure, which cooperatively define a passenger compartment and a continuous opening for a passenger to enter into and exiat out of the passenger compartment. The front door is movable between a first closed position and a first open position. The rear door is movable between a second closed position and a second open position. When the front door is in the first closed position and the rear door is simultaneously in the second closed position, the continuous opening is closed cooperatively by the front door and the rear door, and the front door and the rear door are in tension. For example, the front door and the rear door may be in tension at an intermediate height of the continuous opening, such as proximate a beltline of the vehicle, with the front door being in tension between the forward base structure and the rear door, and the rear door being in tension between the front door and the rearward base structure.

Another passenger vehicle includes a vehicle body, and a first door. The vehicle body includes a forward base structure, a rearward base structure, and a floor structure extending between the forward body structure and the rearward body structure, which cooperatively define a passenger compartment and a continuous opening for a passenger to enter into and exit out the passenger compartment. The first door is movable between a first closed position and a first open position. The first door includes a first outer door structure and a first internal door structure coupled to and substantially hidden from view by the first outer door structure. The first internal door structure comprises a primary structural member having a forward structural segment, a rearward structural segment, and an intermediate structural segment extending between the forward structural segment and the rearward structural segment. When the first door is in the first closed position, the forward structural segment overlaps the forward body structure in a forward direction and is close proximity thereto, the rearward structural segment overlaps the floor structure and is in close proximity thereto, and the intermediate structural segment extends diagonally downward and rearward from the forward structural segment to the rearward structural segment. The first internal door structure may further comprise a beam member coupled to the primary member, which includes a forward beam segment, a rearward beam segment, and an intermediate beam segment extending downward and rearward from the forward beam segment to the rearward beam segment. The forward beam segment overlaps in the forward direction the forward body structure and is mated with the forward structural segment, the intermediate beam segment is mated with the intermediate structural segment, and the rearward beam segment overlaps floor structure and is mated to the rearward structural segment.

Another vehicle includes a vehicle body, and a front door. The vehicle body includes a forward base structure, a rearward base structure, and a floor structure extending between the forward body structure and the rearward body structure, which cooperatively define a passenger compartment and a continuous opening for a passenger to enter into and exit out the passenger compartment. The front door is movable between a first closed position in which the front door at least partially closes the opening and a first open position. The front door includes a first primary door structure having a first rearward portion. When the front door is in the first closed position, the first rearward portion of the first primary door structure is configured to transfer loading to the floor structure to resist an inboard moment caused by a standard dynamic load applied to the front door in a manner substantially independent of any roof structure of the vehicle body. The first primary door structure may additionally include a foot portion that protrudes inboard of the rearward portion to which the floor structure is configured to apply an upward reaction force to resist the inboard moment. The vehicle may additionally include a latch mechanism that is configured to apply an inward reaction force to the first rearward structural portion to resist the inboard moment. The vehicle may further include a rear door, which is cooperatively configured with the front door to transfer loading to the floor structure to resist the inboard moment substantially independent of any roof structure of the vehicle body.

A passenger vehicle includes a vehicle body, a front door, and a rear door. The vehicle body includes a forward base structure, a rearward base structure, and a floor structure extending between the forward body structure and the rearward body structure, which cooperatively define a passenger compartment and a continuous opening for a passenger to enter into and exit out the passenger compartment. The front door is movable between a first closed position and a first open position. The rear door is movable between a second closed position and a second open position. When the front door is in the first closed position and the rear door is simultaneously in the second closed position, the continuous opening is closed cooperatively by the front door and the rear door, the front door is movable to the first open position with the rear door remaining in the second closed position, and the rear door is movable to the second open position with the front door remaining in the first closed position. The front door may also be releasably coupleable to the rear door when in the first and second closed positions, respectively, such as with an intermediate latch mechanism.

Another passenger vehicle includes a vehicle body, a front door, and a rear door. The vehicle body includes a forward base structure, a rearward base structure, and a floor structure extending between the forward body structure and the rearward body structure, which cooperatively define a passenger compartment and a continuous opening for a passenger to enter into and exit out the passenger compartment. The front door is movable between a first closed position and a first open position. The front door comprises a first internal door structure having a first upper portion and a first lower portion. The rear door is moveable between a second closed position and a second open position. The rear door includes a second internal door structure having a second upper portion and a second lower portion. In the first closed, position, a forward end of the first upper portion is releasably coupled to the forward body structure with a forward upper latch mechanism, and a rearward end of the first lower portion is releasably coupled to the floor structure with a forward lower latch mechanism. In the second closed position, a rearward end of the second upper portion is releasably coupled to the rearward body structure with a rearward upper latch mechanism, and a forward end of the second lower portion is releasably coupled to the floor structure with a rearward lower latch mechanism. When the front door is in the first closed position and the rear door is simultaneously in the second closed position, a rearward end of the first upper portion is releasably coupled to a forward end of the second upper portion with an intermediate latch mechanism.

BRIEF DESCRIPTION OF THE DRAWINGS

FIG. 2 is a side view of the passenger vehicle in a first configuration with closed doors.

FIG. 3 is a side view of the passenger vehicle in a second configuration with open doors.

FIG. 9 is a schematic cross-sectional view taken along line 9-9 in FIG. 4.

FIG. 10 is a cross-sectional view taken along line 10-10 in FIG. 7.

FIG. 12 is a cross-sectional view taken along line 12-12 in FIG. 7.

FIG. 13 is a cross-sectional view taken along line 13-13 in FIG. 7.

FIG. 15 is a partial side view of a vehicle according to another embodiment.

FIG. 16 is a partial side view of a vehicle according to another embodiment.

DETAILED DESCRIPTION

As discussed in further detail below with reference to the figures, an exemplary passenger vehicle includes a vehicle body and one or more doors configured to absorb and/or distribute loading of the doors to the vehicle body. For example, the door configured to absorb and/or distribute loading from a standard dynamic loading event (e.g., from a mobile deformable barrier (MDB) during dynamic testing under Federal Motor Vehicle Safety Standard (FMVSS) 214D) and/or from a quasi-static loading event (e.g., during quasi-stating testing under FMVSS 214S) substantially independent of a roof structure of the vehicle body. Advantageously, the passenger vehicle incorporating the vehicle body and doors disclosed herein may provide passengers with substantially unobstructed views out a side of a vehicle and provide a continuous opening for ingress/egress by omitting an intermediate body structure extending to the roof structure (i.e., a B-pillar), as is typically found in four-door passenger vehicles. The vehicle body, doors, and their various subsystems, subassemblies, components, and related methods may, however, provide various other advantages.

As used herein directional terms, such as "forward," "rearward," "fore," "aft," etc. are oriented with respect to a normal direction of travel of the vehicle. Directional terms "inboard" and "outboard" refer to generally horizontal directions moving, respectively, from outside to inside, or inside to outside, a passenger compartment of the passenger vehicle.

Figure 1:
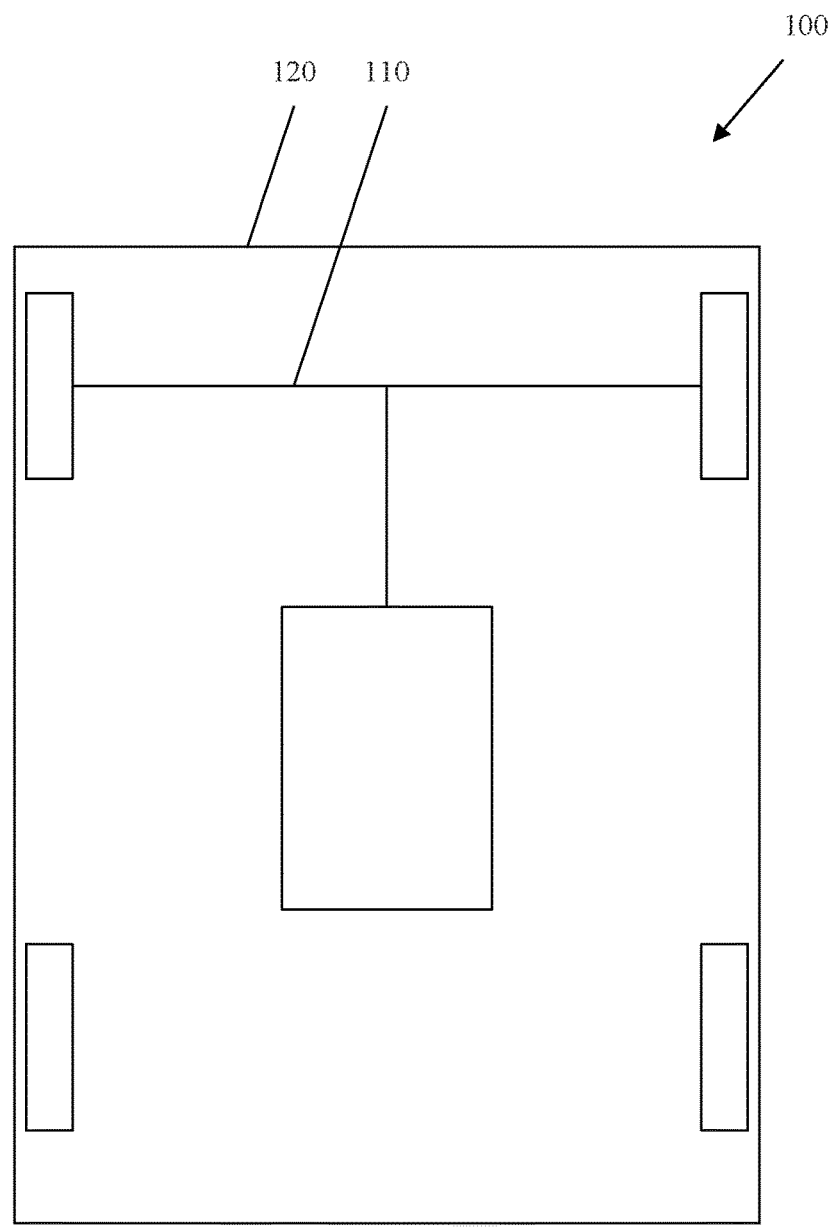
FIG. 1 is top schematic view of a passenger vehicle according to an exemplary embodiment.

Referring to FIG. 1, a vehicle 100 (e.g., passenger vehicle) is configured for use on a public roadway, such as a highway, interstate freeway, or local roads managed by a federal, state, or local government. As shown schematically, the vehicle 100 generally includes a powertrain 110 and a vehicle body 120 (e.g., body structure) coupled to the powertrain 110. The powertrain 110 is configured to convert energy from a stored energy source (e.g., battery, gasoline, diesel fuel, hydrogen, etc.) into motive force for propelling the vehicle 100 along the public roadway. For example, the powertrain 110 may include one or more electric motors and/or one or more combustion engines that rotate wheels for propelling the vehicle 100 along the roadway.

As shown in the left side views of FIG. 2 and FIG. 3, the vehicle body 120 generally includes a forward body structure 222, a rearward body structure 224, a floor structure 226, and a roof structure 228. The forward body structure 222, the rearward body structure 224, the floor structure 226, and the roof structure 228 are fixedly coupled to each other to cooperatively form the vehicle body 120 as a generally rigid structure but which may resiliently flex (e.g., under normal driving conditions). According to some exemplary embodiments, the vehicle body 120 may omit the roof structure 228, or the roof structure 228 may be movable.

The vehicle body 120 defines a passenger compartment 330 therein, while the forward body structure 222, the rearward body structure 224, and the floor structure 226 cooperatively define an opening 332 (e.g., entrance) that allows entry of a passenger into (e.g., ingress) and exit of a passenger out of (e.g., egress) the passenger compartment 330. The opening 332 is continuous between the forward body structure 222, the rearward body structure 224, the floor structure 226, and the roof structure 228 (if present). That is, the opening 332 is not physically divided (e.g., partitioned, interrupted, etc.) into multiple separate openings. In contrast, a typical four-door vehicle (i.e., having front and rear doors on each side of the vehicle) includes a static B-pillar structure at an outboard position extending between a floor and a roof at an intermediate fore-aft location of the traditional vehicle. Other previous four-door vehicles include a static B-post structure at an outboard position, which extends upward from a floor to a beltline but not to a roof of such vehicle. These static B-pillar and B-post structures provide or define a front passenger opening and a separate rear passenger opening. The vehicle body 120 of the vehicle 100, however, does not include a similar static B-pillar, B-post structure, or other static portion or structure extending between the floor structure 226 and the roof structure 228 at an intermediate location along a length of the vehicle 100 (e.g., within a middle 50% of the overall length of the opening 332), but instead the opening 332 is continuous.

The forward body structure 222, the rearward body structure 224, the floor structure 226, and the roof structure 228 may be individual components that are fixedly coupled to each other, or may be cooperatively formed by one or more components that are coupled to each other (e.g., a lower portion of the forward body structure 222 and a forward portion of the floor structure 226 may be formed by one or more common components). The vehicle body 120 may be similarly configured on its right side (not shown).

The forward body structure 222 generally includes a forward base structure 222a and a forward pillar structure 222b (e.g., A-pillar or first pillar structure or portion). The forward pillar structure 222b is coupled to and extends upward from the forward base structure 222a, and is coupled to and supports a forward end of the roof structure 228. A front window (e.g., a windshield or windscreen; not shown) may also be coupled to and supported by the forward pillar structure 222b and an opposite forward pillar structure (i.e., on a right side of the vehicle). The forward base structure 222a and the forward pillar structure 222b may be formed by one or more common components, or separate components coupled to each other. The forward body structure 222 transitions from, or demarcates between, the forward base structure 222a and the forward pillar structure 222b in a beltline 201 (e.g., beltline region) of the vehicle 100. The beltline 201 of the vehicle 100 is a location or region at an intermediate height of the vehicle 100 surrounding the transition or demarcation between opaque lower side structures of the vehicle structure (e.g., body and door panels) and transparent side windows (e.g., window panel or pane). While the beltline 201 is depicted as being straight and horizontal, the beltline 201 may follow other profiles (e.g., curved, non-horizontal, etc.).

The rearward body structure 224 includes a rearward base structure 224a and may also include one or more rearward pillar structures 224b (e.g., C-pillar, D-pillar, or second pillar structure or portion). The rearward pillar structure 224b is coupled to and extends upward from the rearward base structure 224a, and is coupled to and supports a rearward portion or end of the roof structure 228. A rear window (e.g., rear wide window or rear windshield; not shown) may also be coupled to and supported by the rearward pillar structure 224b. The rearward base structure 224a and the rearward pillar structure 224b may be formed by one or more common components, or separate components coupled to each other. The rearward body structure 224 is considered to transition from, or demarcate between, the rearward base structure 224a and the rearward pillar structure 224b in the beltline 201 of the vehicle 100. For vehicles 100 having a roof structure 228 that is movable (e.g., a convertible), the rearward pillar structure 224b may be movable or omitted.

The vehicle 100, on its left side, further includes a first door 240 (e.g., first or front door) and another second door 260 (e.g., second or rear door). The first door 240 and the second door 260 are cooperatively configured to close the opening 332 (i.e., to prevent ingress and egress of passengers), while also being configured to absorb and transfer outboard loading (e.g., standardized loading) to the forward body structure 222, the rearward body structure 224, the floor structure 226, and/or the roof structure 228. The vehicle 100 may similarly include an additional first door 240 and an additional second door 260 on its right side (not shown). The second door 260 and its various structures, components, features, etc. may be labeled as being a second or rear such structures, components, features, etc. so as to distinguish between those of the first door 240.

The first door 240 generally includes a door structure 242 and a window 244 (e.g., first window). The first door 240 is movable between a closed position (e.g., a first closed position) as shown in FIG. 2 and an open position (e.g., a first open position) as shown in FIG. 3. The second door 260 similarly includes a door structure 262 (e.g., second or rear door structure) and a window 264 (e.g., second or rear window). The second door 260 is also movable between a closed position (e.g., a second closed position) as shown in FIG. 2 and an open position (e.g., a second open position) as shown in FIG. 3. When the first door 240 and the second door 260 are simultaneously in their respective closed positions, the opening 332 is closed to prevent or restrict ingress into and egress out of the passenger compartment 330 by a passenger. The first door 240 and the second door 260 may be slidably coupled to the vehicle body 120 as shown in FIG. 3, or may be hingedly coupled (e.g., pivotably coupled), for example, to the forward body structure 222 and the rearward body structure 224, respectively, for example, about substantially vertical axes.

Figure 4:
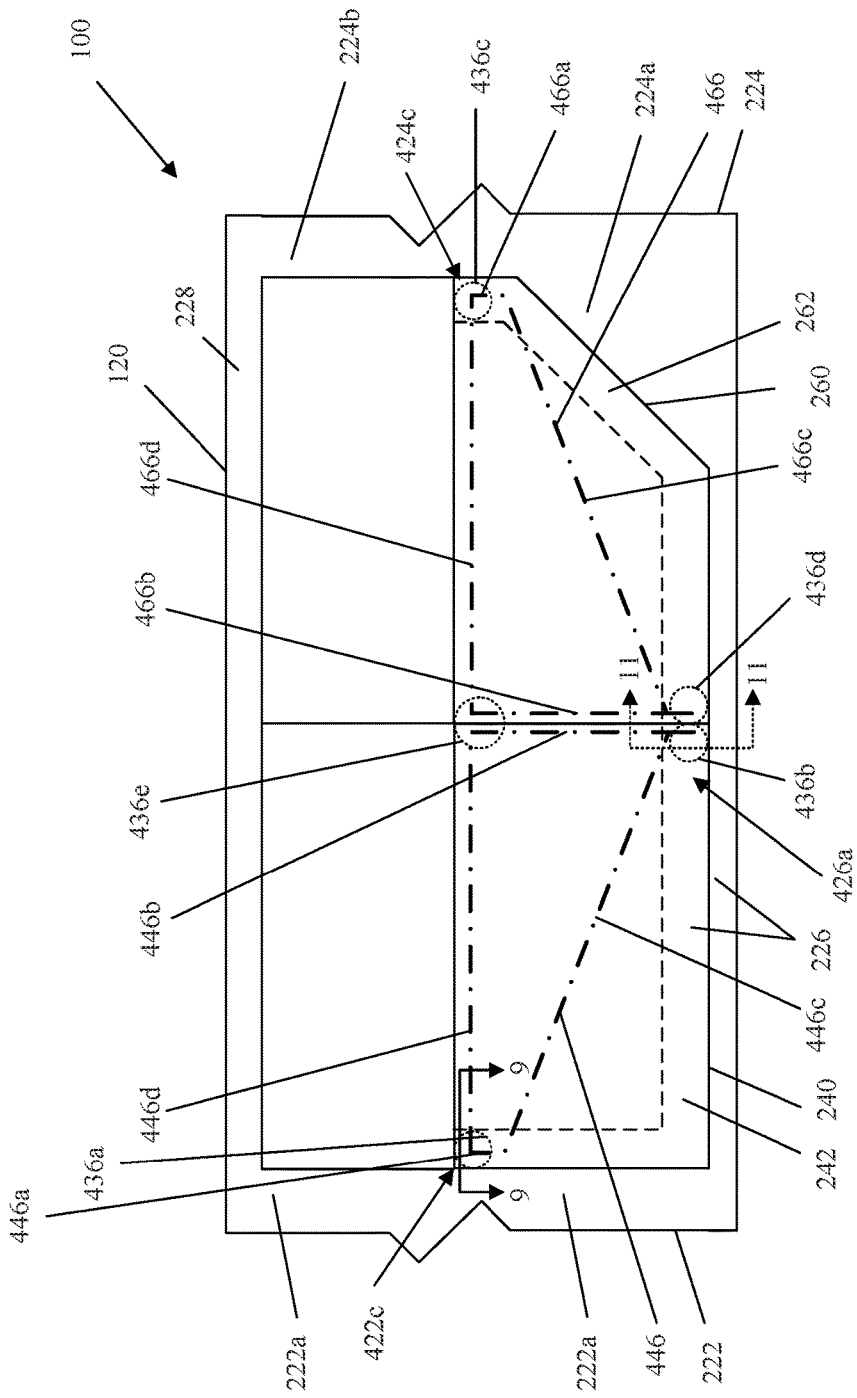
FIG. 4 is a schematic side view of the passenger vehicle.

As depicted schematically in FIG. 4, the door structure 242 of the first door 240 includes a primary door structure 446 (e.g., a first or primary internal door structure; shown in dash-dot lines), which is coupled to and substantially hidden from view by an outer door structure 248 (e.g., first outer or secondary door structure). The door structure 262 of the second door 260 includes another primary door structure 466 (e.g., a second primary or internal door structure; shown in dash-dot lines), which is coupled to and substantially hidden from view by another outer door structure 268 (e.g., second outer or secondary door structure). The primary door structures 446, 466 of the first door 240 and the second door 260 are configured to cooperatively transfer a substantial majority of loading to the first door 240 and the second door 260 from the standard dynamic loading event (e.g., from an MDB during FMVSS dynamic testing) to the vehicle body 120 to limit intrusion into the passenger compartment 330. In FIG. 4, inboard edges of the forward base structure 222a, floor structure 226, and rearward base structure 224a are depicted in phantom as dash-dash lines, which illustrate overlapping relationships for load transfer between the primary door structures 446, 466 to portions of the vehicle body 120.

As compared to the primary door structures 446, 466, the outer door structures 248, 268 and/or other structures and components of the first door 240 and the second door 260 are configured for absorbing, distributing, and/or transferring only an insubstantial portion of the standard dynamic loading to the vehicle body 120 (e.g., FMVSS dynamic testing). However, the outer door structures 248, 268 and other door structures and components may be configured to absorb, distribute, and/or transfer substantial portions of other standard loading (e.g., such as the standard quasi-static loading applied during the quasi-static testing under FMVSS 214S) to the vehicle body 120. Furthermore, while the windows 244, 264 or other upper structures of the first door 240 or second door 260 may engage the roof structure 228, such upper structures of the first door 240 and the second door 260 are capable of absorbing, distributing, and/or transferring only an insubstantial portion of the standard loading to the vehicle body 120, such that substantial majorities of the standard dynamic and quasi-static loading of the first door 240 and the second door 260 are transferred to the vehicle body 120 independent of the roof structure 228.

Focusing first on the first door 240, the door structure 242 generally includes the outer door structure 248 and the primary door structure 446 (depicted in phantom as dash-dot lines in FIG. 4). The outer door structure 248 defines a cavity in which the primary door structure 446 is positioned and substantially hidden from view, and which may receive the window 244 when lowered.

Figure 5:
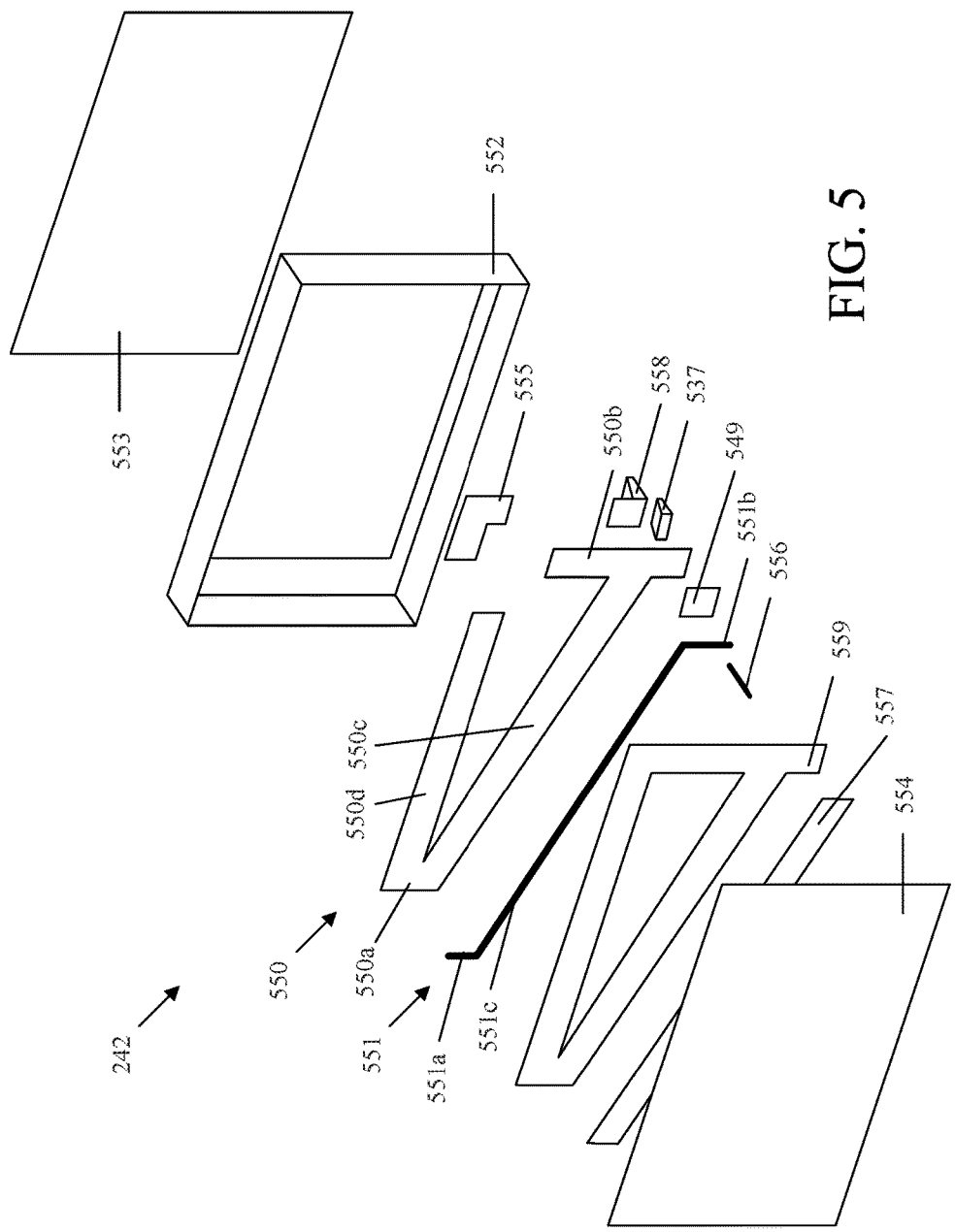
FIG. 5 is an upper perspective exploded view of a first door of the vehicle.

As shown in the exploded perspective view in FIG. 5, the outer door structure 248 includes an outer door frame 552 (e.g., peripheral or outer door frame or door structure), an inboard door panel 553 coupled to and positioned inboard of the outer door frame 552, and an outboard door panel 554 coupled to and positioned outboard of the outer door frame 552. As will be discussed in further detail below, when the first door 240 is in the closed position, the primary door structure 446 overlaps and is in close proximity with the forward base structure 222a and the floor structure 226 of the vehicle body 120, so as to quickly transfer force thereto in an inboard direction upon application of standard dynamic loading to the first door 240.

The primary door structure 446 is additionally configured to couple to and interface the floor structure 226, so as to substantially resist an inboard moment caused by standard dynamic loading to the first door 240. The primary door structure 446 does not extend above the beltline 201 of the vehicle 100 at an intermediate fore-aft location of the vehicle 100, and no other structural member of the vehicle body 120 (e.g., a conventional fixed B-pillar), or of either the first door 240 or the second door 260 (e.g., a movable B-pillar), extends upward from the primary door structure 446, which would otherwise be capable of transferring any substantial portion of the standard dynamic loading to the roof structure 228. By omitting such vertical structures at an intermediate fore-aft location of the opening 332, a substantially unobstructed view may be provided through the windows 244, 264 out the left side of the vehicle 100 (i.e., between the forward pillar structure 222b and the rearward pillar structure 224b).

Figure 7:
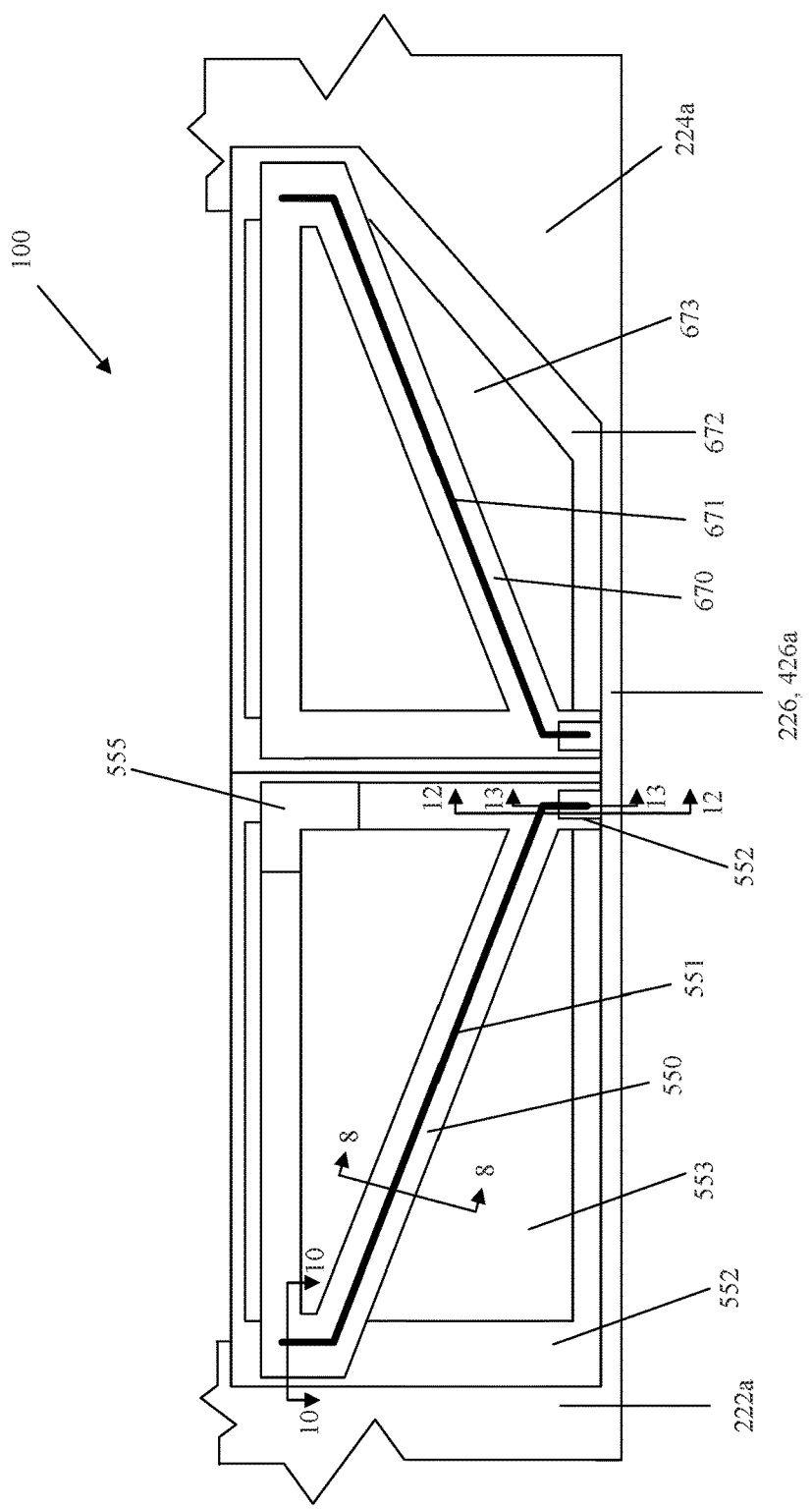
FIG. 7 is another side view of the passenger vehicle.

As shown in FIGS. 5 and 7, the primary door structure 446 includes a primary structural member 550 (e.g., primary member or primary internal member) and a beam member 551, among other elements, which are coupled to each other. The primary structural member 550 and the beam member 551 form the primary door structure 446 with a forward portion 446a (e.g., first or forward end portion or region), a rearward portion 446b (e.g., first or rearward upright portion or region), an intermediate portion 446c (e.g., middle, diagonal, or lower intermediate portion or region), and an upper portion 446d (e.g., upper, horizontal, top, or upper intermediate portion or region). The forward portion 446a is positioned proximate a forward end of the first door 240, and may form a joint between the intermediate portion 446c and the upper portion 446d. The rearward portion 446b is positioned proximate a rearward end of the first door 240, and may extend upward and downward relative to the intermediate portion 446c. The intermediate portion 446c may extend rearward and downward from the forward portion 446a to the rearward portion 446b. The upper portion 446d is positioned proximate an upper end of the first door 240, and extends rearward from the forward portion 446a toward the rearward portion 446b. While the primary door structure 446 is substantially hidden from view by the outer door structure 248, various limited portions of the primary door structure 446 may still protrude out of the cavity (e.g., in cutouts of the outer door frame 552 or inboard door panel 553), and/or may be concealed by other trim components, so as to be engageable with or otherwise transfer force to portions of the vehicle body 120 (e.g., the floor structure 226).

Figure 8:
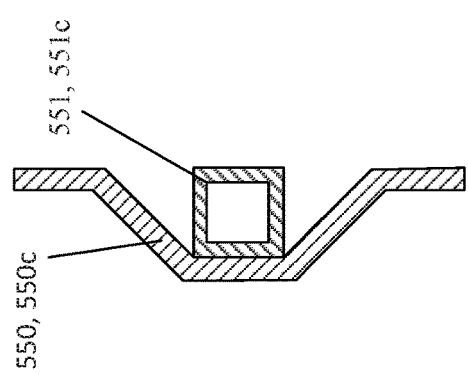
FIG. 8 is a cross-sectional view taken along line 8-8 in FIG. 7.

The primary structural member 550 (e.g., first primary structure or internal member) is a unitary, continuous member. For example, the primary structural member 550 may be a hot-stamped boron steel component. The primary structural member 550 includes a forward structural segment 550a (e.g., first forward end or segment), a rearward structural segment 550b (e.g., first rearward end or segment), an intermediate structural segment 550c (e.g., first intermediate segment), and an upper structural segment 550d (e.g., first upper segment). The forward structural segment 550a forms a joint that connects the intermediate structural segment 550c and the upper structural segment 550d, and may form an outboard convex or C-shaped recess (see, e.g., FIG. 8), which receives the beam member 551 therein.

The intermediate structural segment 550c extends downward and rearward from the forward structural segment 550a to the rearward structural segment 550b. From the left side view, the intermediate structural segment 550c may extend downward and rearward at a constant angle, but may follow other contours. From a top view, the intermediate structural segment 550c may extend rearward at a constant angle, but may follow other contours (e.g., being curved in an inboard-outboard direction, such as to follow contours of the inboard door panel 553 and/or the outboard door panel 554). The intermediate structural segment 550c has a cross-sectional shape that is concave or C-shaped to provide rigidity to the intermediate structural segment 550c. The cross-sectional shape may be generally constant along a majority of the intermediate structural segment 550c. The intermediate structural segment 550c may extend at different angles and/or have an irregular or different cross-sectional shape.

The upper structural segment 550d extends rearward from the forward structural segment 550a to terminate at a rearward end thereof. The upper structural segment 550d may, for example, extend along the beltline 201. From the left side view, the upper structural segment 550d may extend at a constant angle (e.g., generally horizontal), or other suitable angle or contour. From a top view, the upper structural segment 550d may extend at a constant angle (e.g., straight rearward), but may follow other contours (e.g., being curved in an inboard-outboard direction, such as to follow contours of the inboard door panel 553 and/or the outboard door panel 554). The upper segment has a cross-sectional shape that is concave or C-shaped to provide rigidity to the upper structural segment 550d. The cross-sectional shape may be generally constant along a majority of the upper structural segment 550d. The upper structural segment 550d may alternatively have a different position, extend at different or varied angles, and/or have a different or irregular cross-sectional shape.

The rearward structural segment 550b extends upward and downward from the intermediate structural segment 550c to terminate at upper and lower ends, respectively, thereof. From the left side view, the rear segment extends straight above and below the intermediate structural segment 550c at generally constant angles (e.g., generally vertical), but may follow other contours (e.g., extending forward or rearward in a straight or curved manner). From a front view, the rearward structural segment 550b extends above and below the intermediate segment straight (e.g., generally vertical), but may follow other contours (e.g., extending inboard or outboard in a straight or curved manner, such as to follow contours of the inboard door panel 553 and/or the outboard door panel 554. The rear segment has a cross-sectional shape that is concave or C-shaped to provide rigidity to the rearward structural segment 550b. The cross-sectional shape is generally constant along a majority of the rearward structural segment 550b above the intermediate structural segment 550c. Below the intermediate structural segment 550c, the rear segment extends downward and inboard, and includes a convex or C-shaped cross-sectional shape. Alternatively, the rearward structural segment 550b may extend at different angles, with different contours, and/or have different cross-sectional shapes above and below the intermediate structural segment 550c.

The primary door structure 446 additionally includes a bracket member 555 (e.g., coupling member), which functions to couple the rearward end of the upper structural segment 550d to the upper end of the rearward structural segment 550b of the primary structural member 550. The bracket member 555 may, for example, be a stamped steel component that mates with and/or is coupled to the primary structural member 550, for example, with fasteners, adhesives, and/or welding. The bracket member 555 forms a rearward end of the upper portion 446d. Alternatively, the upper structural segment 550d and the rearward structural segment 550b may have a continuous joint therebetween (i.e., not terminate at rearward and upper ends, respectively, thereof) in which case the bracket member 555 may be omitted.

While the primary structural member 550 has been described as a unitary member, it is contemplated that the primary structural member 550 instead be configured as a multi-piece structure, for example, with the upper structural segment 550d or other segments (or portions thereof), being formed with another member.

The beam member 551 (e.g., first beam member) is a unitary, continuous member. For example, the beam member 551 may be a hydroformed steel, tubular component. The beam member 551 includes a forward beam segment 551a (e.g., a first forward beam end), a rearward beam segment 551b (e.g., a first rearward beam segment), and an intermediate beam segment 551c (e.g., a first intermediate beam segment). The intermediate beam segment 551c extends substantially parallel with (i.e., following the contour of) the intermediate structural segment 550c to be mated (e.g., received against and/or at least partially within) with and/or coupled thereto (e.g., with conventional fasteners, adhesives, and/or welding) to form the intermediate portion 446c of the primary door structure 446. The intermediate beam segment 551c may also be received at least partially within an outboard facing recess of the intermediate structural segment 550c of the primary structural member 550 (see FIG. 8), which is formed by the concave cross-sectional shape thereof. The intermediate beam segment 551c has a cross cross-sectional shape (e.g., rectangular or box tubular), which may be constant along a majority thereof. Alternatively, the intermediate beam segment 551c may have a different contour (e.g., different than the primary structural member 550) and/or have a different or irregular cross-sectional shape.

The forward beam segment 551a extends upward from the intermediate beam segment 551c to terminate at an upper end thereof. The forward beam segment 551a may extend at a generally constant angle (e.g., substantially vertical), and have a cross-sectional shape (e.g., rectangular or box tubular) that provides rigidity to the forward beam segment 551a and that may be constant along a majority thereof. Alternatively, the forward beam segment 551a may extend at varying or different angles (e.g., non-vertical, bent, or varying) and/or have an irregular or different cross-sectional shape.

The forward beam segment 551a mates with and/or is coupled to the forward structural segment 550a of the primary structural member 550 (e.g., with fasteners, adhesives, and/or welding) to cooperatively form the forward portion 446a of the primary door structure 446. The forward beam segment 551a may also be received within the outboard facing recess of the forward structural segment 550a of the primary structural member 550, which is formed by the concave cross-sectional shape thereof.

The rearward beam segment 551b extends downward from the intermediate beam segment 551c to terminate at a lower end thereof. The rearward beam segment 551b may additionally extend inboard relative to the intermediate beam segment 551c, for example, to follow the contour of the rearward structural segment 550b. The rearward beam segment 551b mates with and/or is coupled the rearward structural segment 550b of the primary structural member 550 below the intermediate structural segment 550c (e.g., with fasteners, adhesives, and/or welding) to cooperatively form at least part of the rearward portion 446b of the primary door structure 446. The rearward beam segment 551b may also be received within the outboard facing recess of the rearward structural segment 550b of the primary structural member 550, which is formed by the concave cross-sectional shape thereof.

The beam member 551 may be configured in other manners, for example, with the beam member 551 interfacing and/or coupling to the primary structural member 550 in different manners. For example, one or more of the forward, rearward, or intermediate beam segments 551a, 551b, 551c may not be coupled directly to the forward, rearward, or intermediate structural segments 550a, 550b, 550c of the primary structural member 550.

The primary door structure 446 may additionally include a reinforcement member 549 (e.g., reinforcement bracket), which is interposed between the rearward beam segment 551b of the beam member 551 and the rearward structural segment 550b of the primary structural member 550. The reinforcement member 549, for example, distributes loading between the primary structural member 550 and the beam member 551. The reinforcement member 549 has an outer convex profile that is received within the rearward structural segment 550*b* of the primary structural member 550, and an inner concave profile that has received therein the rearward beam segment 551*b* of the beam member 551.

In this rearward lower region of the primary door structure 446, a bolt 556 may extend through each of, and thereby couple to each other (i.e., forming a bolted joint), the rearward structural segment 550*b*, the rearward beam segment 551*b*, and the reinforcement member 549. On an inboard side, a striker 537 (or other portion of a latch mechanism) may also be coupled to the rearward structural segment 550*b* of the primary structural member 550 and/or the bolt 556.

The primary door structure 446 also includes a foot member 558, which as discussed in further detail below, functions to distribute outboard loading to an upper surface of the floor structure 226. The foot member 558 is coupled to the primary structural member 550 inboard of the rearward structural segment 550*b* at an elevation slightly above that of the floor structure 226.

The door structure 242 may also include other internal components substantially hidden from view by the outer door structure 248, inboard door panel 553, and outboard door panel 554, such as an intrusion beam 557, and a shear panel 559. The intrusion beam 557 is configured to absorb and/or transfer initial loading from standard quasi-static loading of the first door 240, so as to prevent or limit intrusion into the passenger compartment 330. The shear panel 559 is coupled to the primary door structure 446 to provide torsional rigidity to the first door 240 for normal operation (e.g., opening/closing the door) but may be capable of absorbing, distributing, and/or transferring only an insubstantial portion of the standard dynamic loading of the primary door structure 446.

As will be discussed in further detail below, the first door 240 additionally includes portions of a forward upper latch mechanism 436*a* (e.g., forward latch mechanism), a forward lower latch mechanism 436*b*, and an intermediate upper latch mechanism 436*e* (e.g., intermediate latch mechanism) (all depicted schematically with dot-dot circular lines in FIG. 4).

Turning to the second door 260, the door structure 262 of the second door 260 is configured similar to the door structure 242 of the first door 240 but having the forward-rearward relationship of its various components generally reversed. The door structure 262 of the second door 260 generally includes the outer door structure 268 and the primary door structure 466. As shown in the exploded perspective view in FIG. 6, the outer door structure 268 includes an outer door frame 672 (e.g., peripheral door frame), an inboard door panel 673 coupled to and positioned inboard of the outer door frame 672, and an outboard door panel 674 coupled to and positioned outboard of the outer door frame 672, which cooperatively define a cavity in which the primary door structure is positioned and substantially concealed from view in the manner described above for the primary door structure 446 of the first door 240. The window 264 may be retractable into the door cavity in a manner similar to the window 244.

As shown schematically in FIG. 4, the orientation of the primary door structure 466 of the second door 260 is generally reversed in a fore-aft direction, as compared to the primary door structure 446 of the first door 240. The primary door structure 466 generally includes a rearward portion 466*a* (e.g., second or rearward end portion or region), a forward portion 466*b* (e.g., second or forward upright portion or region), an intermediate portion 466*c* (e.g., second middle or diagonal portion or region) extending forward and downward from the rearward portion 466*a* to the forward portion 466*b*, and an upper portion 466*d* (e.g., second upper or top portion region) extending forward from the rearward portion 466*a*. As with the primary door structure 446 of the first door 240, the primary door structure 466 of the second door does not extend above the beltline 201 of the vehicle 100 at an intermediate fore-aft location of the vehicle 100, and no other structural member thereof (e.g., a movable B-pillar) extends upward from the primary door structure 466, which would be capable of transferring any substantial portion of the standard dynamic loading to the roof structure 228. Omission of such vertical structural members of the vehicle body 120 may provide a substantially unobstructed view out the side of the vehicle through the windows 244, 264 between the forward pillar structure 222*b* and the rearward pillar structure 224*b*.

Similar to the first door 240, when the second door 260 is in the closed position, the primary door structure 466 overlaps and is in close proximity with the rearward base structure 224*a* and the floor structure 226 of the vehicle body 120, so as to quickly transfer force thereto in an inboard direction upon application of standard dynamic loading to the second door 260. The primary door structure 466 of the second door 260 is additionally configured to couple to and interface the floor structure 226, so as to substantially resist an inboard moment caused by standard dynamic loading to the first door 240.

Figure 6:
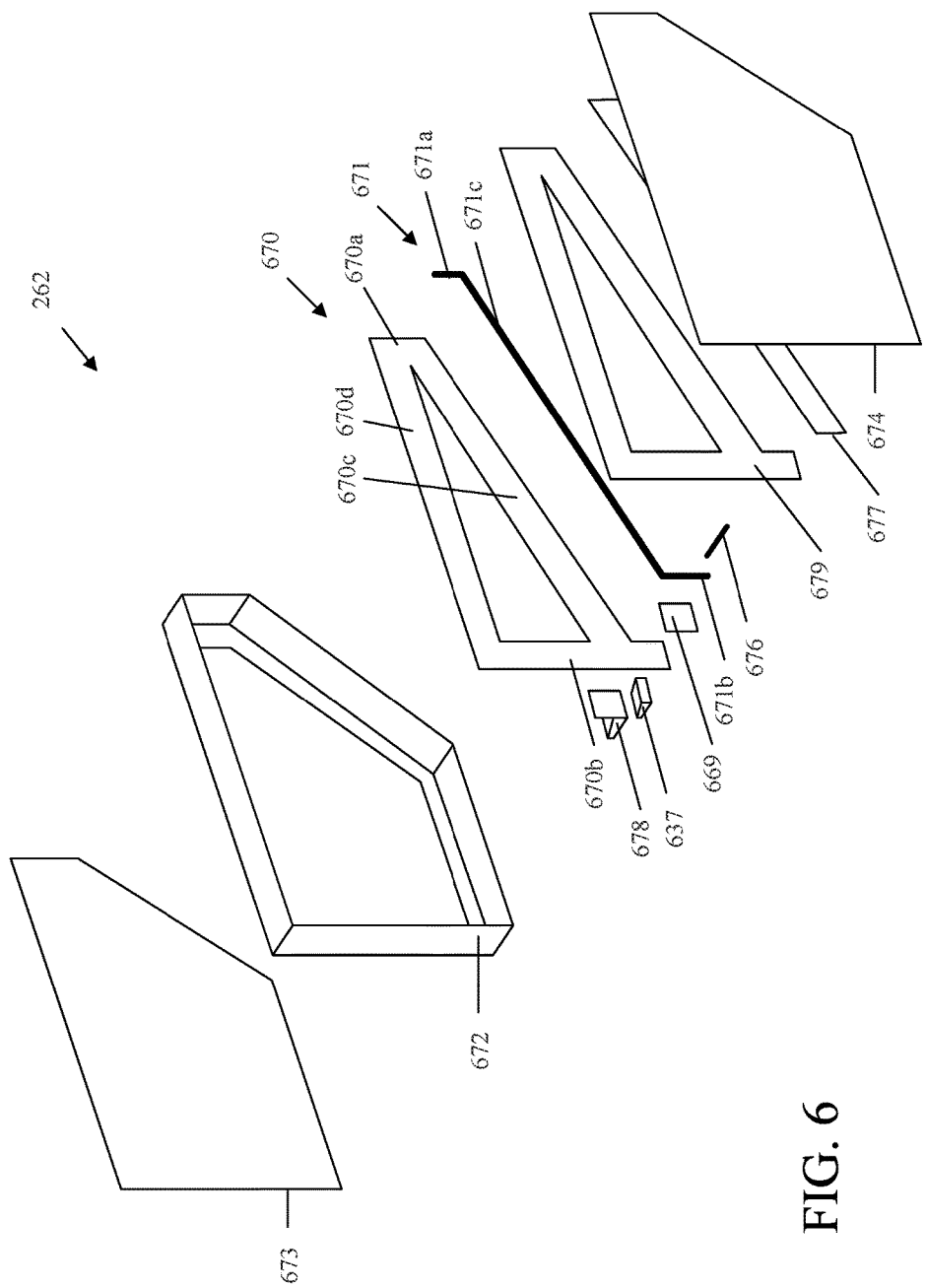
FIG. 6 is an upper perspective exploded view of a second door of the vehicle.

As shown structurally in FIGS. 6 and 7, the structural components of the primary door structure 466 of the second door 260 are similar to those of the primary door structure 446 of the first door 240 but are generally reversed in a fore-aft direction. The primary door structure 466 of the second door 460 is formed by or comprises a primary structural member 670 (e.g., a second primary structure or internal member) and a beam member 671 (e.g., second beam member or structure), and may include still further components or members, which individually or cooperatively form the rearward portion 466*a*, the forward portion 466*b*, the intermediate portion 466*c*, and the upper portion 466*d* of the primary door structure 466.

The primary structural member 670 is a unitary, continuous member. For example, the primary structural member 670 may be a hot-stamped boron steel component. The primary structural member 670 includes a rearward structural segment 670*a* (e.g., second rearward or structural segment or end), a forward structural segment 670*b* (e.g., second forward end), an intermediate structural segment 670*c* (e.g., segment intermediate segment) extending downward and forward from the rearward structural segment 670*a* to the forward structural segment 670*b*, and an upper structural segment 670*d* (e.g., second upper segment) extending forward from the rearward structural segment 670*a*. For further details of the rearward structural segment 670*a*, the forward structural segment 670*b*, the intermediate structural segment 670*c*, and the upper structural segment 670*d* (e.g., position, shape, alternative configurations, etc.), refer to the discussion above of the forward structural segment 550*a*, the rearward structural segment 550*b*, the intermediate structural segment 550*c*, and the upper structural segment 550*d*, respectively, of the primary structural member 550. As depicted in FIG. 6-7, the forward structural segment 670*b* and the upper structural segment 670*d* intersect each other, thereby omitting an intervening bracket (e.g., similar to the bracket member 555 of the first primary door structure 446).

The beam member 671 is a unitary, continuous member. For example, the beam member 671 may be a hydroformed steel, tubular component. The beam member 671 includes a rearward beam segment 671*a* (e.g., a second rearward beam end), a forward beam segment 671*b* (e.g., a second forward beam segment), and an intermediate beam segment 671*c* (e.g., a second intermediate beam segment) extending forward and downward from the rearward beam segment 671*a* to the forward beam segment 671*b*. For further details of the rearward beam segment 671*a*, the forward beam segment 671*b*, and the intermediate beam segment 671*c* (e.g., position, shape, attachment, relative position to the primary structural member 670, alternative configurations, etc.), refer to the discussion above for the forward beam segment 551*a*, the rearward beam segment 551*b*, and the intermediate beam segment 551*c*, respectively, of the beam member 551.

In the forward lower region, the second primary door structure 466 may also include a bolt 676 forming a bolted joint between the forward structural segment 670*b*, the forward beam segment 671*b*, and the reinforcement member 669, and/or a striker 637 (or other portion of a latch mechanism). The primary door structure 466 may additionally include a reinforcement member 669 interposed between the rearward beam segment 671*a* of the beam member 671 and the rearward structural segment 670*a* of the primary structural member 670. The second primary door structure 466 also includes a foot member 678, which functions to distribute outboard loading to an upper surface of the floor structure 226. For further details of the bolt 676, striker 637, and foot member 678 (e.g., position, shape, function, attachment, alternative configurations, etc.), refer to the discussion above of the bolt 556, striker 537, and foot member 558 above.

The door structure 262 may also include other internal components substantially hidden from view by the outer door structure 268 (e.g., by one or more of the outer door frame 672, the inboard door panel 673, and/or the outboard door panel 674), such as an intrusion beam 677, and a shear panel 679, which are, respectively, configured as are the intrusion beam 557 and the shear panel 559 described previously.

As will be discussed in further detail below, the second door 260 additionally includes portions of a rearward upper latch mechanism 436*c* (e.g., rearward latch mechanism), a rearward lower latch mechanism 436*d*, and the intermediate upper latch mechanism 436*e* (all depicted schematically with dot-dot circular lines in FIG. 4).

When the first door 240 and the second door 260 are simultaneously in the closed positions, the first door 240 and the second door 260 cooperatively close the opening 332 (see FIG. 2). Individually and cooperatively, the first door 240 and the second door 260 are also configured to distribute standard dynamic load to the vehicle body 120 (i.e., the forward base structure 222*a*, the rearward base structure 224*a*, and the floor structure 226).

When each of the first door 240 and the second door 260 are in their respective closed positions, the primary door structures 446, 466 thereof overlap and are in close proximity to various parts of the vehicle body 120 of the vehicle 100 (shown schematically in FIGS. 4, 9, and 10, and shown structurally in FIGS. 7, and 11-13). These overlapping relationships and close proximity allow the primary door structures 446, 466 to quickly transfer standard dynamic loading to the vehicle body 120. As shown schematically in FIGS. 4 and 9, when the first door 240 is in its closed position, the forward portion 446*a* of the primary door structure 446 overlaps an upper region 422*c* of the forward base structure 222*a* of the vehicle body 120 in a fore-aft direction (e.g., in a forward direction), and is in close proximity in an inboard-outboard direction thereto. For example, the primary door structure 446 may be in close proximity with the forward base structure 22*a* by direct engagement, engage and/or compress one or more members arranged therebetween (e.g., the outer door frame 552 or other structure), and/or otherwise a short distance therefrom, such as 1 cm, 5 mm, 2 mm or less, though other inboard-outboard distances may be suitable.

When the first door 240, and thereby the primary door structure 446 receives the standard dynamic load (i.e., Floading_event), the forward base structure 222*a* applies an outboard reaction force (RF1) thereagainst. This overlapping relationship is shown structurally in FIGS. 7 and 10 in which the forward structural segment 550*a* of the primary structural member 550 and/or the forward beam segment 551*a* of the beam member 551 extend forward past and are positioned outboard of the upper region 422*c* of the forward base structure 222*a*. The primary structural member 550 is positioned in close proximity to the forward base structure 222*a*, but may include intermediate components positioned therebetween, such as the inboard door panel 553, which provides quick loading to the vehicle body 120 upon occurrence of the standard dynamic loading event. This overlapping relationship is within an intermediate vertical region of the vehicle 100, such as within a middle 50% of the overall height of the opening 332, or within approximately several inches of the beltline 201 of the vehicle 100.

Figure 11:
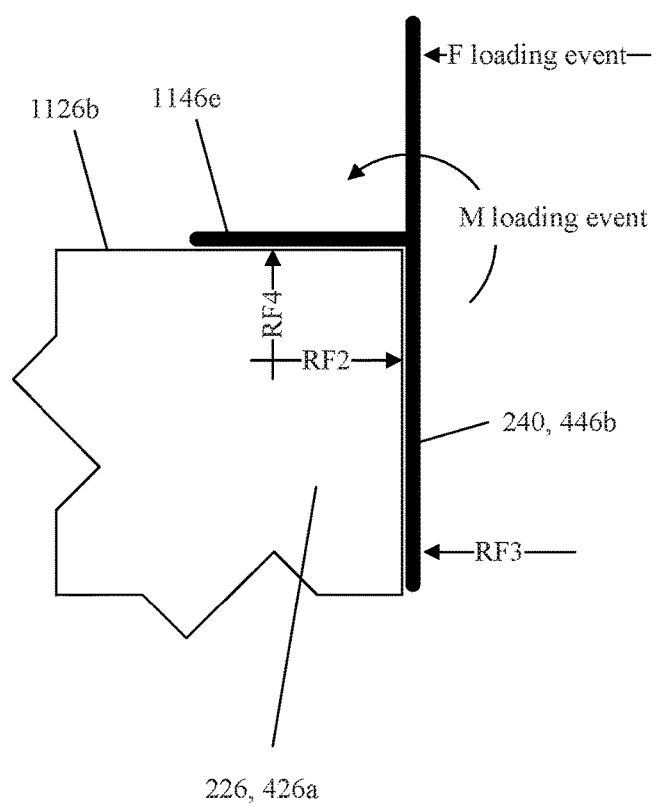
FIG. 11 is a schematic cross-sectional view taken along line 11-11 in FIG. 4.

As shown schematically in FIGS. 4 and 11 and structurally in FIGS. 7, 12, and 13, the rearward portion 446*b* of the primary door structure 446, including the rearward structural segment 550*b* of the primary structural member 550 and the rearward beam segment 551*b* of the beam member 551, overlaps in a vertical direction (e.g., in a downward direction), and is in close proximity in an inboard-outboard direction to, an intermediate floor region 426*a* of the floor structure 226. This overlapping relationship is within the intermediate fore-aft region of the vehicle 100, such as within a middle 50% of the overall length of the opening 332.

The second door 260, when in its closed position, is configured to overlap the vehicle body 120 in a similar manner as the first door 240. The rearward portion 466*a* of the primary door structure overlaps in a fore-aft direction (e.g., in a rearward direction), and is in close proximity in an inboard-outboard direction, to an upper region 424*c* of the rearward base structure 224*a* of the vehicle body 120 (refer to the primary door structure 446 of the first door 240 in FIGS. 4 and 9). The rearward portion 466*a*, including the rearward structural segment 670*a* of the primary structural member 670 and/or the rearward beam segment 671*a* of the beam member 671, is positioned outboard of an extends rearward at least partially over or past the rearward base structure 224*a* (refer to the primary structural member 550 and the beam member 551 in FIGS. 5 and 10). This overlapping relationship is also within the intermediate vertical region of the vehicle, as described above for the first door 240.

The forward portion 466*b* of the second primary door structure 466 overlaps in a vertical direction (e.g., downward direction), and is in close proximity in an inboard-outboard direction, to the intermediate floor region 426*a* of the floor structure 226 (refer to the primary door structure 446 of the first door 240 in FIGS. 10-12). The forward portion 466*b*, including the forward structural segment 670*b* of the primary structural member 670 and the forward beam segment 671*b* of the beam member 671, is positioned outboard of and extends downward at least partially over or past the floor structure 226. This overlapping relationship is also within the intermediate fore-aft region of the vehicle 100, as described above for the first door 240, though positioned rearward of the first door 240.

As the opening 332 is continuous and uninterrupted by any intermediate static structure from the floor structure 226 toward or to the roof structure 228, upper ends of the rearward portion 446*b* of the first primary door structure 446 and the forward portion 466*b* of the second primary door structure 466 do not overlap and are not in close proximity for loading any portion of the body structure in an upper or the intermediate vertical region of the opening 332. Nor do the rearward portion 446*b* and the forward portion 466*b* of the primary door structures 446, 466 extend upward to overlap or be in close proximity to the roof structure 228 for transferring load thereto during the standard dynamic loading.

Instead, when the first door 240 and the second door 260 are in their closed positions, the primary door structures 446, 466 couple to and interface with the floor structure 226 to substantially resist an inboard moment caused by the standard dynamic loading.

As shown schematically in the cross-sectional view of FIG. 11 (taken from line 11-11 in the schematic view of FIG. 4), the standard dynamic loading event applies inboard force (F_loading_event) to the first door 240, which creates an inboard moment M_loading_event of the first door 240 about the floor structure 226. Resisting this inboard force, the floor structure 226 applies an outboard reaction force RF2 in an outboard direction against the lower end of the rearward portion 446*b* of the first primary door structure 446. In the region of the outboard reaction force RF2, the floor structures forms a fulcrum about which the inboard moment M_loading_event is formed and about which the primary door structure 446 may pivot. Resisting this moment, the forward lower latch mechanism 436*b*, which is coupled to the floor structure 226, applies an inboard reaction force RF3 to the rearward portion 446*b* of the first primary door structure 446 at a location below the outboard reaction force RF2. Further resisting this moment, an upper floor surface 1126*b* of the floor structure 226 applies an upward reaction force RF4 to a foot portion 1146*e* of the primary door structure 446 (i.e., formed by the foot member 678), which protrudes inboard from the rearward portion 446*b* of the first primary door structure 446. The reaction forces RF2, RF3, and RF4 may be applied directly between the structures and members described, or an intermediate member or component may be positioned therebetween, such as a trim component, outer door structure 248 (not shown in FIGS. 12-13), etc.

As shown structurally in the cross-sectional views of FIGS. 12-13, (taken from lines 12-12 and 13-13 from FIG. 7), the latch mechanism 436*b* is configured to apply the reaction force RF3 to the first door 240, so as to resist the inboard moment M_loading_event. According to one non-limiting example, the latch mechanism 436*b* generally includes the striker 537 fixedly coupled to the first door 240, and a latch 1238 (e.g., latch mechanism or movable latch) that is incorporated into the floor structure 226. The striker 537, for example, includes a shaft 1237*a* (e.g., striker shaft) that extends in a fore-aft direction, and a striker bracket 1237*b* that rigidly holds the shaft 1237*a* at an inboard position relative to the first primary door structure 446. The striker bracket 1237*b* is coupled to the primary door structure 446 with the bolt 556. The bolt 556, as shown in FIG. 13, extends through the striker bracket 1237*b*, the rearward structural segment 550*b* of the primary structural member 550, the reinforcement member 549, and the rearward beam segment 551*b* of the beam member 551 to form a bolted joint therebetween.

According to one non-limiting example, the latch 1238 generally includes a lower rotating member 1238*a*, an upper rotating member 1238*b*, and a latch base 1238*c* (e.g., latch base structure or housing). The latch base 1238*c* is rigidly coupled to and forms part of the floor structure 226, so as to transfer loading from the latch base 1238*c* to other structures and components of the floor structure 226. The lower rotating member 1238*a* and the upper rotating member 1238*b* are rotatably coupled to the latch base 1238*c* about axes that are substantially parallel with the shaft 1237*a* of the striker 537. The latch base 1238*c* forms a recess in which the lower rotating member 1238*a* and the upper rotating member 1238*b* are positioned, and which receives therein the striker 537 when the first door 240 is moved to the closed position.

When the striker 537 is inserted into the recess of the latch base 1238*c*, the lower rotating member 1238*a* is rotated upward (i.e., in a counterclockwise direction as shown) to engage an outboard surface of the shaft 1237*a*. The lower rotating member 1238*a* includes a curved surface that with continued rotation applies an inboard force against the shaft 1237*a* and draws the first door 240 into its closed position. The upper rotating member 1238*b* is rotated downward (i.e., clockwise as shown) to engage an upper surface of the shaft 1237*a*. The upper rotating member 1238*b* may instead, or additionally, be rotated downward to engage, or come in close proximity to, an outboard end of the lower rotating member 1238*a*. In this manner, the lower rotating member 1238*a* and the upper rotating member 1238*b* substantially surround or encircle the shaft 1237*a*. The latch 1238 may additionally include a locking member 1338*d* that is movable to/from a position between the inboard ends of the lower rotating member 1238*a* and the upper rotating member 1238*b* to, thereby, prevent relative rotation between the lower rotating member 1238*a* and the upper rotating member 1238*b* and prevent release of the shaft 1237*a*.

The latch base 1238*c* is coupled to and forms part of the floor structure 226 (e.g., part of a floor sill). The latch base 1238*c* includes an outboard surface 1238*e* (e.g., outer or outboard surface or edge) that applies the outboard reaction force RF2 to the primary door structure 446. The latch base 1238*c* also includes an upper surface 1238*f* that forms the upper surface 1226*b* of the floor structure 226, which applies the upward reaction force RF4 to the foot member 558. Various other components may be positioned on the upper surface 1226*b* of the floor structure 226, such as trim components or decorative materials.

During normal operation and when in the closed position, gaps may be maintained between structures of the first door 240 and the vehicle body 120, for example, to prevent interference by the vehicle body 120 as the first door 240 is moved between the open and closed positions. During the standard dynamic loading event, these gaps (if present) must be eliminated for the first door 240 to distribute force to the vehicle body 120 of the vehicle 100. Initially during the standard dynamic loading event, the first door 240 is moved inboard until floor structure 226 (e.g., the outboard surface 1238*e* of the latch base 1238*c*) applies the outboard reaction force RF2 to the rearward portion 446*b* of the primary door structure 446. As the door is rotated about the outboard surface 1238*e* of the latch base 1238*c*, the lower rotating member 1238*a* then applies the inboard force RF3 to the striker 537 at a location below the outboard reaction force RF2, and the upper surface 1238f of the latch base 1238c (i.e., forming the upper floor surface 1126b of the floor structure 226) applies the upward reaction force RF4 to the foot member 558. As non-limiting examples, the inboard reaction force RF3 may be applied between approximately 50 mm and 150 mm below the outboard reaction force RF2, for example, by positioning the axis of the shaft 1237a such a distance below an upper edge of the outboard surface 1238e of the latch base 1238c.

The latch mechanism 436b (and other latch mechanisms 436a and 436c-e) may, for example, be electronically actuated (e.g., using an electric motor or other actuator) and controlled by a controller (not shown), for example, according to selection by a user, a pre-programmed control routine, and/or feedback to the control system (e.g., current draw and/or position of the actuator). The controller may additionally control the other latch mechanisms associated with the first door 240 (e.g., the forward upper latch mechanism 436a and the intermediate upper latch mechanism 436e) and/or the second door 260 in a cooperative manner (e.g., with staged and/or simultaneous operation) to close and/or open the first door 240. Furthermore, with the latch mechanisms 436a-e being electronically actuated, or the first door 240 and the second door 260 otherwise being moved in a controlled manner, greater control may be provided for opening and closing operations, as compared to mechanical or manually actuated mechanism, which may allow for smaller gaps or clearances between the first door 240 and the second door 260 and portions of the vehicle body 120. These closer clearances, advantageously, may provide for quicker loading from the first door 240 and the second door 260 to the vehicle body 120 during standard loading events.

According to other exemplary embodiments, the interface between the first door 240 and the floor structure 226, including the latch mechanism 436b, may be configured in other manners. For example, while the floor structure 226 is depicted as being coplanar with the upper surface 1238f formed by the latch base 1238c, the floor structure 226 may be non-coplanar, for example, with an inboard region of the floor structure 226 being at a higher elevation. The latch mechanism 436b, instead of applying the inboard reaction force RF3 to the lower end of the primary door structure 446, may instead be configured to apply a downward reaction force to the foot portion 1146e of the primary door structure 446 at a location outboard of the upward reaction force RF4. The latch mechanism 436b may be configured in other manners, for example, with the striker 537 being fixedly coupled to the floor structure 226 and the latch 1238 being movably coupled to the first door 240, providing more than one set of lower and upper latch members (i.e., the lower rotating member 1238a and the upper rotating member 1238b) from the same or opposing rotational direction (e.g., for redundancy).

The second door 260 is configured to couple and transfer loading to the intermediate floor region 426a of the floor structure 226 in substantially the same manner as the first door 240, for example, using the rearward lower latch mechanism 436d. Various components of the forward lower latch mechanism 436b, such as the latch housing 1236c, may be shared between the lower latch mechanisms 436b, 436d.

Referring again to FIG. 4, in addition to the lower latch mechanism 436b, 436d, the upper latch mechanisms 436a, 436c, 436e also function to retain the first door 240 and the second door 260 in their closed positions and also transfer loading to the vehicle body 120. Furthermore, the upper latch mechanisms 436a, 436c, 436e are cooperatively configured to place and maintain the first door 240 and the second door 260 in tension between the forward body structure 222 and the rearward body structure 224 during normal closing operations thereof (i.e., prior to detection or occurrence of standard loading). When the first door 240 and the second door 260 are in their closed positions and the tensive force applied, the first door 240 is in tension between the forward body structure 222 and the second door 260, and the second door 260 is in tension between the first door 240 and the rearward body structure 224. By applying a tensive force with one or more of the upper latch mechanisms 436a, 436c, 436e, which are positioned at an intermediate height of the vehicle 100 (e.g., proximate the beltline 201), the first door 240 and the second door 260 are in tension between the forward body structure 222 and the rearward body structure 224 and, in particular, upper portions 446d, 466d of the primary door structure 446, 466 are in tension (e.g., the upper structural segments 550d, 670d of the primary structural members 550, 670) along the beltline 201 of the vehicle 100. As compared to the first door 240 and the second door 260 not being in tension, this normally applied tension may quicken load distribution (e.g., from standard loading events) from the first door 240 and/or the second door 260 to the forward body structure 222 and the rearward body structure 224. Upon detection of an impact event, for example by the controller, the one or more of the upper latch mechanisms 436a, 436c, 436e may be further actuable to increase the tensive force (e.g., with a pyrotechnic or other mechanical movement).

As depicted schematically in FIG. 4, the forward upper latch mechanism 436a and the forward lower latch mechanism 436b releasably couple the first door 240 to the forward base structure 222a and the floor structure 226. When the first door 240 is in the closed position, the forward portion 446a of the primary door structure 446 is releasably coupled to the upper region 422c of the forward base structure 222a with the forward upper latch mechanism 436a (e.g., forward upper latch mechanism; depicted schematically with a dot-dot circular line). The forward upper latch mechanism 436a is actuable to apply and hold a tensive force in a fore-aft direction the upper portion 446d of the primary door structure 446, or to hold the upper portion 446d in tension as one or more of the other upper latch mechanisms 436c, 436e are actuated to apply a tensive force to the first door 240 and/or the second door 260. The forward upper latch mechanism 436a may be further configured to move the first door 240 in an inboard direction as the first door 240 is closed and then hold the first door 240 in its closed position. The rearward portion 446b of the first door 240 is releasably coupled to the floor structure 226 by the forward lower latch mechanism 436b, as described previously.

Figure 14:
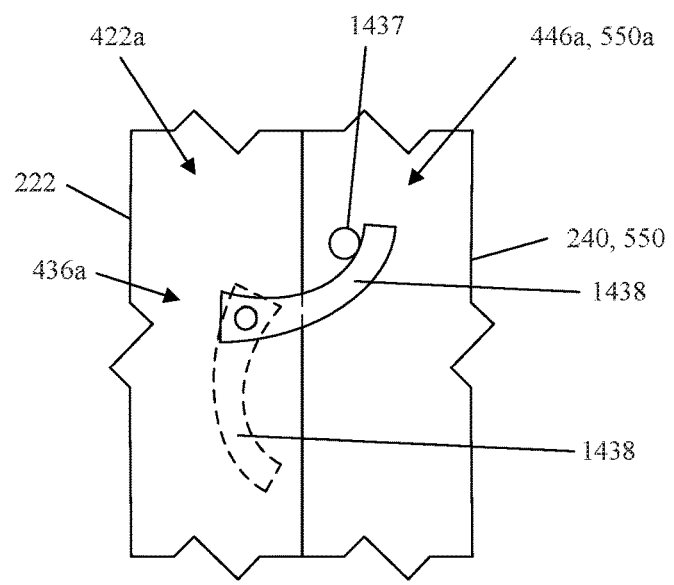
FIG. 14 a partial view taken of a latch mechanism 436a depicted schematically in FIG. 4.

As shown in FIG. 14, according to one non-limiting example, the forward upper latch mechanism 436a is configured to apply a tensive force between the forward base structure 222a and the first door 240. The latch mechanism 436a generally includes a striker 1437 and a latch 1438. The striker 1437 is fixedly coupled to the forward portion 446a of the primary door structure 446 of the first door 240, such as to the forward structural segment 550a of the primary structural member 550. The latch 1438 is rotatably coupled to the upper region 422c of the forward base structure 222a, so as to engage and apply the tensive force to the striker 1437 (i.e., by pulling the striker 1437 in a forward direction) as the latch 1438 is rotated. The forward upper latch mechanism 436a be configured in another manner suitable to be actuated to releasably couple the first door 240 to the forward body structure 222 and for placing, or maintaining, the first door 240 in tension. For example, the positions of the striker 1437 and the latch 1438 may be reversed, multiple latches 1438 may be provided, or an entirely different type of latch mechanism (e.g., other cinching latch, etc.) may be used.

The rearward upper latch mechanism 436c and the rearward lower latch mechanism 436d releasably couple the second door 260 to the rearward base structure 224a and the floor structure 226, respectively. The rearward portion 466a of the primary door structure 466 is releasably coupled to the upper region 424c of the rearward base structure 224a with the rearward upper latch mechanism 436c (e.g., upper rear latch mechanism; depicted schematically with a dot-dot circular line). The rearward upper latch mechanism 436c may be configured similar to the forward upper latch mechanism 436a or any other suitable configuration sufficient to apply or maintain a tensive force to the second door 260 and/or maintain the second door 260 in its closed position. The rearward latch mechanism 436d is configured to releasably couple the forward portion 466b of the second door 260 to the intermediate floor region 426a of the floor structure 226, as described above for the latch mechanism 436b.

Additionally, when the first door 240 and the second door 260 are simultaneously in their respective closed positions, the first door 240 and the second door 260 are releasably coupled to each other, for example, with the fifth releasable latch mechanism 436e (e.g., upper intermediate latch mechanism; depicted schematically as a dot-dot circular line). More particularly, the rearward end of the upper portion 446d of the primary door structure 446 of the first door 240 (e.g., the rearward structural segment 550b and/or the upper structural segment 550d of the primary structural member 550) is releasably coupled to the forward end of the upper portion 466d of the second primary door structure 466 of the second door 260 (e.g., the forward structural segment 670b and/or the upper structural segment 670d of the primary structural member 670). The upper intermediate latch mechanism 436e may be configured similar to the forward upper latch mechanism 436a or any other suitable configuration sufficient to apply or maintain a tensive force between the first door 240 and the second door 260 and/or maintain the first door 240 and the second door 260 in their closed positions.

While the vehicle body 120, the first door 240, and the second door 260, as described herein, include five latch mechanisms, two dedicated to the first door 240 (i.e., the forward upper and forward lower latch mechanisms 436a, 436b), two dedicated to the second door 260 (i.e., the rearward upper and rearward lower latch mechanisms 436c, 436d), and one in common between the first door 240 and the second door 260 (i.e., the forward upper latch mechanism 436e), the vehicle 100 may instead include a different number of latch mechanisms. For example, the first door 240 may include only one dedicated latch, for example, positioned at a fore-aft and/or vertical position between the depicted locations of the forward upper and forward lower latch mechanisms 436a, 436b, which may function to resist the moment caused by the standard loading and/or to place or maintain the first door 240 in tension. The second door 260 may similarly be configured with only one dedicated latch, while the first and second doors 260 would still include a common latch therebetween. As a result, the vehicle 100 may, instead, include only three latch mechanisms associated with a pair of doors on a given side of the vehicle 100.

Additionally, the first door 240 and the second door 260 are configured to open independent of each other, such when in their respective closed positions, either the first door 240 or the second door 260 may be moved to its open position, while the other door remains in its closed position. For example, to move the first door 240 from the closed position to the open position, the forward upper latch mechanism 436a, the forward lower latch mechanism 436b, and the intermediate upper latch mechanism 436e are operated to release the first door 240, thereby allowing the first door 240 to be moved (e.g., slid or rotated) automatically (e.g., by an electric motor or actuator controlled by the vehicle control system), manually by a user, or a combination thereof. When the first door 240 is released or moved to the open position, the rearward upper latch mechanism 436c and/or the rearward lower latch mechanism 436d may or may not also release the second door 260. For example, the rearward upper and/or lower latch mechanisms 436c, 436d may be operated to relieve the tensive force applied to the second door 260, and thereby to the first door 240, in conjunction with the forward and intermediate upper latch mechanisms 436a, 436e. Conversely, to move the second door 260 from the closed position to the open position, the rearward upper latch mechanism 436c, the rearward lower latch mechanism 436b, and the intermediate upper latch mechanism 436e are operated to release the second door 260, thereby allowing the second door 260 to be moved (e.g., slid or rotated) automatically (e.g., by an electric motor or actuator controlled by the vehicle control system), manually by a user, or a combination thereof. When the second door 260 is released or moved to the closed position, the forward upper latch mechanism 436a and/or the forward lower latch mechanism 436b may or may not also release the second door 260.

To allow independent opening, the first door 240 and the second door 260 are configured without features that might otherwise interfere with opening of the other door. For example, no static rigid portion of the first door 240 overlaps (i.e., extends rearward at least partially over or past) any static rigid portion of the second door 260, and no static rigid portion of the second door 260 overlaps (i.e., extends forward at least partially over or past) any static rigid portion of the first door 240. Alternatively, the door to remain closed (e.g, the second door 260) may be moved rearward and/or outboard slightly to another position (e.g., a second closed position) in which that door still effectively closes the opening 332 to prevent ingress/egress but does not interfere with the other door. According to still further embodiments, the first door 240 and the second door 260 may include movable components or portions that normally overlap or engage each other when the first door 240 and the second door 260 are in their closed positions (e.g., seal members, windows 244, 264, etc.) but which are moved into disengaged positions to allow opening of the other door. According to still further embodiments, the first door 240 and the second door 260 may include resilient components or portions (e.g., seals, gaskets, etc.) that deflect during opening and/or closing of one of the first door 240 and the second door 260 independent of the other.

As referenced above, each of the first door 240 and the second door 260 may be coupled to the vehicle body 120, for example, by being slidably coupled to the vehicle body 120 (e.g., to the floor structure 226 and/or the roof structures 228) or hingedly coupled to the vehicle body 120 (e.g., to the forward body structure 222 and/or the rearward body structure 224 about a substantially vertical axis or other upright axis).

According to other exemplary embodiments, a door is configured to couple to a floor structure of a vehicle by way of a post that is substantially hidden within the door. For example, as shown in a partial cutaway view in FIG. 15, a vehicle 1500 includes a door 1540 rotatably coupled to a post 1590 that is substantially hidden within a cavity of the door 1540, such as between inboard and outboard door panels of the door. The vehicle 1500 includes a body structure 1520 having a floor structure 1526 (e.g., a sill) with a base 1590a of the post 1590 fixedly coupled thereto at a forward, rearward, and/or intermediate fore-aft location of an opening of the vehicle 1500. The door 1540 is supported by an upper segment 1590b (e.g., upper end) of the post 1590. In particular, a door structure 1542 is mounted to the upper segment 1590b of the post 1590 with bearings 1592 (e.g., upper and lower bearings as shown). The bearings 1592 support the door 1540, so as to prevent or otherwise control translational movement (e.g., upward and/or horizontal) relative to the post 1590, while allowing the door 1540 to rotate about the post 1590 between open and closed positions. The bearings 1592 are also contained within the cavity of the door 1540, so as to be hidden from view. The post 1590 may be configured to transfer standard loading of the door 1540 to the floor structure 1524, such as in the manner the base 1590a is coupled to the floor structure 1524. The door 1540, including the door structure 1542, may be configured in the manners described above, or in another manner suitable to transfer standard loading via the post 1590 to the floor structure 1524 and/or to other portions of the body structure 1520.

According to another exemplary embodiment, as shown in a partial cutaway view in FIG. 16, a vehicle 1600 includes a door 1640 that is fixedly coupled to a post 1690, which in turn is rotatably coupled to a floor structure 1626 of a body of the vehicle 1600. An upper portion 1690b of the post 1690 is positioned in a cavity of the door 1640 to be hidden from view and fixedly coupled to an internal door structure 1642 of the door 1640. A base 1690a of the post 1690 is rotatably coupled to the floor structure 1626 with bearings 1692 at, for example, a forward, rearward, or intermediate fore-aft location of an opening of the vehicle 1600. The bearings 1692 support the post 1690, so as to prevent translational movement (e.g., upward and/or horizontal) of the post 1690 and the door 1640 relative to the floor structure 1626, while allowing the post 1690 and the door 1640 to rotate between open and closed positions. The post 1690 may be configured to transfer standard loading of the door 1540 to the floor structure 1524. The door 1540, including the door structure 1542, may be configured in the manners described above, or in another manner suitable to transfer standard loading via the post 1690 to the floor structure 1624 and/or to other portions of the body structure 1620.

What is claimed is:

1. A passenger vehicle comprising:
   a vehicle body comprising a forward base structure, a rearward base structure, and a floor structure extending between the forward base structure and the rearward base structure, which cooperatively define a passenger compartment and a continuous opening for a passenger to enter into and exit out the passenger compartment;
   a front door movable between a first closed position and a first open position; and
   a rear door movable between a second closed position and a second open position;
   wherein when the front door is in the first closed position and the rear door is simultaneously in the second closed position, the continuous opening is closed cooperatively by the front door and the rear door, and the front door and the rear door are in tension.

2. The passenger vehicle according to claim 1, wherein when the front door is in the first closed position and the rear door is simultaneously in the second closed position, the front door and the rear door are in tension proximate a beltline of the passenger vehicle.

3. The passenger vehicle according to claim 2, wherein when the front door is in the first closed position and the rear door is simultaneously in the second closed position, the front door is in tension between the forward base structure and the rear door, and the rear door is in tension between the front door and the rearward base structure.

4. The passenger vehicle according to claim 3, wherein when the front door is in the first closed position and the rear door is simultaneously in the second closed position, the front door is releasably coupled to the rear door.

5. The passenger vehicle according to claim 4, wherein when the front door is in the first closed position and the rear door is simultaneously in the second closed position, the front door is releasably coupled to the forward base structure with a forward latch mechanism, the rear door is releasably coupled to the rearward base structure with a rearward latch mechanism, and the front door is releasably coupled to the rear door with an intermediate latch mechanism, and wherein the intermediate latch mechanism, the forward latch mechanism, and the rearward latch mechanism cooperatively operate to place the front door and the rear door in tension.

6. The passenger vehicle according to claim 1, wherein the front door comprises a first internal door structure that is covered from view and that includes a first upper portion and a first lower portion, the rear door comprises a second internal door structure that is hidden from view and that includes a second upper portion and a second lower portion, and a rear end of the first upper portion is releasably coupleable to a forward end of the second upper portion to releasably couple the front door to the rear door and place the front door and the rear door in tension.

7. The passenger vehicle according to claim 6, wherein when the front door is in the first closed position, the first upper portion overlaps the forward base structure and the first lower portion overlaps the floor structure, and when the rear door is in the second closed position, the second upper portion overlaps the rearward base structure and the second lower portion overlaps the floor structure.

8. The passenger vehicle according to claim 7, wherein the first lower portion is releasably coupleable to the floor structure to releasably couple the front door to the floor structure in the first closed position, and the second lower portion is releasably coupleable to the floor structure to releasably couple the rear door to the floor structure in the second closed position.

9. The passenger vehicle according to claim 8, wherein a rearward end of the first upper portion and a forward end of the second upper portion are not directly coupleable to any static portion of the vehicle body with any latch mechanism.

10. The passenger vehicle according to claim 1, wherein in an intermediate fore-aft region of the continuous opening proximate a rearward end of the front door and a forward end of the rear door, the vehicle body comprises no static structure extending upward from the floor structure to proximate a beltline of the passenger vehicle to divide the continuous opening.

11. The passenger vehicle according to claim 10, wherein the vehicle body further comprises a roof structure, and no static structure extends from the roof structure to the floor structure in the intermediate fore-aft region of the continuous opening.

12. The passenger vehicle according to claim 1, wherein when the front door is in the first closed position and the rear door is simultaneously in the second closed position, the front door is in tension between the forward base structure and the rear door proximate a beltline of the passenger vehicle, and the rear door is in tension between the front door and the rearward base structure proximate the beltline;

wherein when the front door is in the first closed position and the rear door is simultaneously in the second closed position, the front door is releasably coupled to the forward base structure with a forward latch mechanism, the rear door is releasably coupled to the rearward base structure with a rearward latch mechanism, and the front door is releasably coupled to the rear door with an intermediate latch mechanism, and wherein the intermediate latch mechanism, the forward latch mechanism, and the rearward latch mechanism cooperatively operate to place the front door and the rear door in tension;

wherein the front door comprises a first internal door structure that is covered from view and that includes a first upper portion and a first lower portion, the rear door comprises a second internal door structure that is hidden from view and that includes a second upper portion and a second lower portion, and wherein when the front door is in the first closed position, the first upper portion overlaps the forward base structure and the first lower portion overlaps the floor structure, and when the rear door is in the second closed position, the second upper portion overlaps the rearward base structure and the second lower portion overlaps the floor structure; and wherein in an intermediate fore-aft region of the continuous opening proximate a rearward end of the front door and a forward end of the rear door, the vehicle body comprises no static structure extending upward from the floor structure to proximate a beltline of the passenger vehicle to divide the continuous opening, and wherein the vehicle body further comprises a roof structure, and no static structure extends from the roof structure to the floor structure in the intermediate fore-aft region of the continuous opening.

13. A passenger vehicle comprising:
a vehicle body comprising a forward base structure, a rearward base structure, and a floor structure extending between the forward base structure and the rearward base structure, which cooperatively define a passenger compartment and a continuous opening for a passenger to enter into and exit out the passenger compartment;
a door movable between a closed position and an open position, the door comprising an outer door structure and an internal door structure coupled to and substantially hidden from view by the outer door structure; and
another door movable between another closed position and another open position, the door and the other door cooperatively closing the continuous opening when in the closed position and the other closed position, respectively;
wherein the internal door structure includes a primary structural member including a forward structural segment, a rearward structural segment, and an intermediate structural segment extending between the forward structural segment and the rearward structural segment; and
wherein when the door is in the closed position, the forward structural segment overlaps the forward base structure in a forward direction and is in close proximity thereto in an inboard-outboard direction, the rearward structural segment overlaps the floor structure in a downward direction and is in close proximity thereto in the inboard-outboard direction, and the intermediate structural segment extends diagonally downward and rearward from the forward structural segment to the rearward structural segment.

14. The passenger vehicle according to claim 13, wherein the forward structural segment overlaps an upper segment of the forward base structure proximate a beltline of the passenger vehicle.

15. The passenger vehicle according to claim 13, wherein the rearward structural segment overlaps the floor structure in an intermediate fore-aft region of the continuous opening.

16. The passenger vehicle according to claim 13, wherein the forward structural segment overlaps an upper segment of the forward base structure proximate a beltline of the passenger vehicle, and the rearward structural segment overlaps the floor structure in an intermediate fore-aft region of the continuous opening;
wherein the internal door structure further includes a beam member coupled to the primary structural member and hidden from view by the outer door structure, the beam member including a forward beam segment mated with the forward structural segment, a rearward beam segment mated with the rearward structural segment, and an intermediate beam segment extending downward and rearward from the forward beam segment to the rearward beam segment and mated with the intermediate structural segment;
wherein when the door is in the closed position, the forward beam segment overlaps in the forward direction the forward base structure, the rearward beam segment extends downward from the intermediate beam segment to overlap the floor structure, and the rearward structural segment extends downward from the intermediate structural segment to overlap the floor structure; and
wherein the internal door structure includes a foot member coupled to and extending inboard of the primary structural member, the foot member being positioned above and in close proximity to the floor structure when the door is in the closed position.

17. The passenger vehicle according to claim 15, wherein the intermediate fore-aft region is within a middle 50% of an overall length of the continuous opening.

18. A passenger vehicle comprising:
a vehicle body comprising a forward base structure, a rearward base structure, and a floor structure extending between the forward base structure and the rearward base structure, which cooperatively define a passenger compartment and a continuous opening for a passenger to enter into and exit out the passenger compartment; and
a door movable between a closed position and a open position, the door comprising an outer door structure and an internal door structure coupled to and substantially hidden from view by the outer door structure;
wherein the internal door structure includes a primary structural member including a forward structural segment, a rearward structural segment, and an intermediate structural segment extending between the forward structural segment and the rearward structural segment; and
wherein when the door is in the closed position, the forward structural segment overlaps the forward base structure in a forward direction and is in close proximity thereto in an inboard-outboard direction, the rearward structural segment overlaps the floor structure in a downward direction and is in close proximity thereto in the inboard-outboard direction, and the intermediate structural segment extends diagonally downward and rearward from the forward structural segment to the rearward structural segment; and wherein the internal door structure further includes a beam member coupled to the primary structural member and hidden from view by the outer door structure, the beam member including a forward beam segment mated with the forward structural segment, a rearward beam segment mated with the rearward structural segment, and an intermediate beam segment extending downward and rearward from the forward beam segment to the rearward beam segment and mated with the intermediate structural segment;

wherein when the door is in the closed position, the forward beam segment overlaps in the forward direction the forward base structure and the rearward beam segment overlaps the floor structure.

19. The passenger vehicle according to claim 18, wherein the beam member is positioned outboard of the primary structural member.

20. The passenger vehicle according to claim 19, wherein the intermediate structural segment is concave, and the intermediate beam segment is received at least partially in the intermediate structural segment.

21. The passenger vehicle according to claim 18, wherein the rearward beam segment extends downward from the intermediate beam segment to overlap the floor structure, and the rearward structural segment extends downward from the intermediate structural segment to overlap the floor structure.

22. A passenger vehicle comprising:
a vehicle body comprising a forward base structure, a rearward base structure, and a floor structure extending between the forward base structure and the rearward base structure, which cooperatively define a passenger compartment and a continuous opening for a passenger to enter into and exit out the passenger compartment; and a door movable between a closed position and a open position, the door comprising an outer door structure and an internal door structure coupled to and substantially hidden from view by the outer door structure;

wherein the internal door structure includes a primary structural member including a forward structural segment, a rearward structural segment, and an intermediate structural segment extending between the forward structural segment and the rearward structural segment;

wherein when the door is in the closed position, the forward structural segment overlaps the forward base structure in a forward direction and is in close proximity thereto in an inboard-outboard direction, the rearward structural segment overlaps the floor structure in a downward direction and is in close proximity thereto in the inboard-outboard direction, and the intermediate structural segment extends diagonally downward and rearward from the forward structural segment to the rearward structural segment;

wherein the internal door structure further includes a foot member coupled to and extending inboard of the primary structural member, the foot member being positioned above and in close proximity to the floor structure when the door is in the closed position; and wherein the floor structure includes a latch mechanism, and the rearward structural segment overlaps the latch mechanism of the floor structure.

23. A passenger vehicle comprising:
a vehicle body comprising a forward base structure, a rearward base structure, and a floor structure extending between the forward base structure and the rearward base structure, which cooperatively define a passenger compartment and a continuous opening for a passenger to enter into and exit out the passenger compartment; and a door movable between a closed position and a open position, the door comprising an outer door structure and an internal door structure coupled to and substantially hidden from view by the outer door structure;

wherein the internal door structure includes a primary structural member including a forward structural segment, a rearward structural segment, and an intermediate structural segment extending between the forward structural segment and the rearward structural segment; and wherein when the door is in the closed position, the forward structural segment overlaps the forward base structure in a forward direction and is in close proximity thereto in an inboard-outboard direction, the rearward structural segment overlaps the floor structure in a downward direction and is in close proximity thereto in the inboard-outboard direction, and the intermediate structural segment extends diagonally downward and rearward from the forward structural segment to the rearward structural segment;

wherein the door is a front door, and the passenger vehicle further comprises a second door that is a rear door movable between a second closed position and a second open position;

wherein when the door is in the closed position and the second door is in the second closed position, the door and the second door cooperatively close the continuous opening; and wherein the second door comprises a second outer door structure and a second internal door structure that is coupled to and substantially hidden from view by the outer door structure, wherein the second internal door structure includes a second primary structural member including a second forward structural segment, a second rearward structural segment, and a second intermediate structural segment extending between the second forward structural segment and the second rearward structural segment; and wherein when the second door is in the second closed position, the second forward structural segment overlaps the floor structure, the rearward structural segment overlaps in a rearward direction the rearward base structure and is in close proximity thereto in the inboard-outboard direction, and the second intermediate structural segment extends diagonally upward and rearward from the second forward structural segment to the second rearward structural segment.

24. The passenger vehicle according to claim 23, wherein the second door further comprises a second beam member coupled to the second primary structural member and substantially hidden from view by the second outer door structure, the second beam member including a second forward beam segment mated with the second forward structural segment, a second rearward beam segment mated with the second rearward structural segment, and a second intermediate beam segment extending upward and rearward from the second forward beam segment to the second rearward beam segment and mated with the second intermediate structural segment;

wherein when the second door is in the second closed position, the second forward beam segment overlaps the floor structure, and the second rearward beam segment overlaps in a rearward direction the rearward base structure.

25. The passenger vehicle according to claim 23, wherein the primary structural member further includes a upper structural segment extending rearward from the forward structural segment;
    wherein the second primary structural member further includes a second upper structural segment extending forward from the second rearward structural segment; and
    wherein the upper structural segment is releasably coupleable to the second upper structural segment with an intermediate latch mechanism that places the upper structural segment and the second upper structural segment in tension.

26. A passenger vehicle comprising:
    a vehicle body comprising a forward base structure, a rearward base structure, and a floor structure extending between the forward base structure and the rearward base structure, which cooperatively define a passenger compartment and a continuous opening for a passenger to enter into and exit out the passenger compartment; and
    a door movable between a closed position and a open position, the door comprising an outer door structure and an internal door structure coupled to and substantially hidden from view by the outer door structure;
    wherein the internal door structure includes a primary structural member including a forward structural segment, a rearward structural segment, and an intermediate structural segment extending between the forward structural segment and the rearward structural segment;
    wherein when the door is in the closed position, the forward structural segment overlaps the forward base structure in a forward direction and is in close proximity thereto in an inboard-outboard direction, the rearward structural segment overlaps the floor structure in a downward direction and is in close proximity thereto in the inboard-outboard direction, and the intermediate structural segment extends diagonally downward and rearward from the forward structural segment to the rearward structural segment; and
    wherein in a region of the continuous opening proximate a rearward end of the door, the vehicle body comprises no static structure extending between the floor structure to a roof structure of the vehicle body to divide the continuous opening.

27. A passenger vehicle comprising:
    a vehicle body comprising a forward body structure, a rearward body structure, and a floor structure extending between the forward body structure and the rearward body structure, which cooperatively define a passenger compartment and a continuous opening for a passenger to enter into and exit out the passenger compartment;
    a front door movable between a first closed position and a first open position, wherein the front door comprises a first internal door structure including a first upper portion and a first lower portion;
    a rear door moveable between a second closed position and a second open position, wherein the rear door comprises a second internal door structure including a second upper portion and a second lower portion;
    wherein in the first closed position, a forward end of the first upper portion is releasably coupled to the forward body structure with a forward latch mechanism, and a rearward end of the first lower portion is releasably coupled to the floor structure with a lower latch mechanism;
    wherein in the second closed position, a rearward end of the second upper portion is releasably coupled to the rearward body structure with a rearward latch mechanism, and a forward end of the second lower portion is releasably coupled to the floor structure with one of the lower latch mechanism or another lower latch mechanism; and
    wherein when the front door is in the first closed position and the rear door is simultaneously in the second closed position, a rearward end of the first upper portion is releasably coupled to a forward end of the second upper portion with an intermediate latch mechanism.

28. The passenger vehicle according to claim 27, wherein the forward latch mechanism, the intermediate latch mechanism, and the rearward latch mechanism are positioned proximate a beltline of the passenger vehicle.

29. The passenger vehicle according to claim 28, wherein the forward latch mechanism, the intermediate latch mechanism, and the rearward latch mechanism are cooperatively configured to place the first internal door structure and the second internal door structure in tension between the forward body structure and the rearward body structure.

30. The passenger vehicle according to claim 27, wherein in a region of the continuous opening proximate a rearward end of the front door and a forward end of the rear door, the vehicle body does not include a static structure extending upward from the floor structure to proximate a beltline of the passenger vehicle to divide the continuous opening.

* * * * *

UNITED STATES PATENT AND TRADEMARK OFFICE
CERTIFICATE OF CORRECTION

Page 1 of 1

PATENT NO. : 10,309,132 B1
APPLICATION NO. : 15/623967
DATED : June 4, 2019
INVENTOR(S) : Noell G. Johnson et al.

It is certified that error appears in the above-identified patent and that said Letters Patent is hereby corrected as shown below:

On the Title Page

In the Abstract
Line number 1:
"A passenger vehicle a vehicle body, a front door"
Should be:
--A passenger vehicle includes a vehicle body, a front door--.

In the Claims

In Column 27, Claim Number 25, Line 7:
"includes a upper"
Should be:
--includes an upper--.

In Column 27, Claim Number 26, Line 27:
"and a open"
Should be:
--and an open--.

Signed and Sealed this
Sixteenth Day of July, 2019

Andrei Iancu
*Director of the United States Patent and Trademark Office*